(12) United States Patent
Tomandl

(10) Patent No.: US 8,066,327 B2
(45) Date of Patent: Nov. 29, 2011

(54) CONTROL MECHANISM

(75) Inventor: Mark G. Tomandl, Cedar Springs, MI (US)

(73) Assignee: Grand Rapids Controls Company LLC, Rockford, MI (US)

( * ) Notice: Subject to any disclaimer, the term of this patent is extended or adjusted under 35 U.S.C. 154(b) by 44 days.

(21) Appl. No.: 12/631,340

(22) Filed: Dec. 4, 2009

(65) Prior Publication Data

US 2010/0164265 A1    Jul. 1, 2010

Related U.S. Application Data

(63) Continuation-in-part of application No. 11/843,422, filed on Aug. 22, 2007, now Pat. No. 7,631,938.

(60) Provisional application No. 60/839,217, filed on Aug. 22, 2006, provisional application No. 60/885,135, filed on Jan. 16, 2007.

(51) Int. Cl.
    *B60N 2/04*    (2006.01)

(52) U.S. Cl. ..................................... 297/326; 297/378.1

(58) Field of Classification Search ............. 297/378.12, 297/344.14, 344.1, 341, 340, 378.1, 378.14, 297/326, 316
See application file for complete search history.

(56) References Cited

U.S. PATENT DOCUMENTS

| | | | |
|---|---|---|---|
| 4,720,143 A | 1/1988 | Schwartz et al. | |
| 4,844,542 A * | 7/1989 | Humer | 297/341 |
| 5,224,750 A | 7/1993 | Clark et al. | |
| 6,382,491 B1 | 5/2002 | Hauser et al. | |
| 6,629,730 B2 * | 10/2003 | Makosa | 297/341 |
| 6,932,409 B2 | 8/2005 | Falchero et al. | |
| 7,533,937 B2 * | 5/2009 | Becker et al. | 297/378.14 |
| 2003/0122412 A1 * | 7/2003 | Niimi et al. | 297/341 |
| 2007/0257536 A1 * | 11/2007 | Nemoto | 297/341 |

* cited by examiner

*Primary Examiner* — Milton Nelson, Jr.
(74) *Attorney, Agent, or Firm* — Price Heneveld LLP

(57) ABSTRACT

An energy storage mechanism for folding seats for vehicles and the like includes an energy-storing component such as a spring that assists in moving the seat or other component. The mechanism provides for relatively small user input forces and distances, yet provides a relatively large force acting over a relatively large distance as an output of the mechanism. The mechanism may be configured to provide for a single user input/release, without requiring powered actuators or the like.

25 Claims, 21 Drawing Sheets

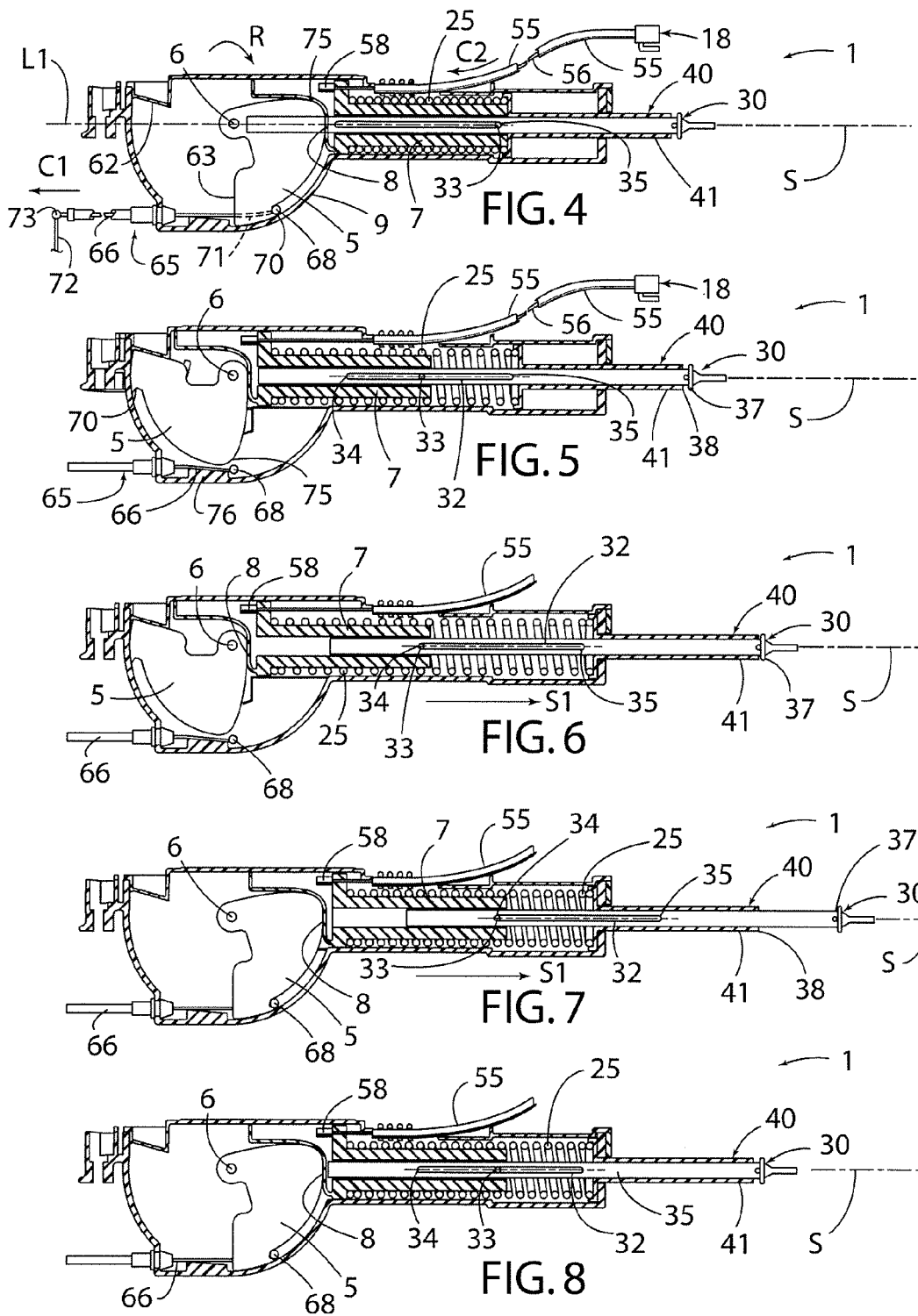

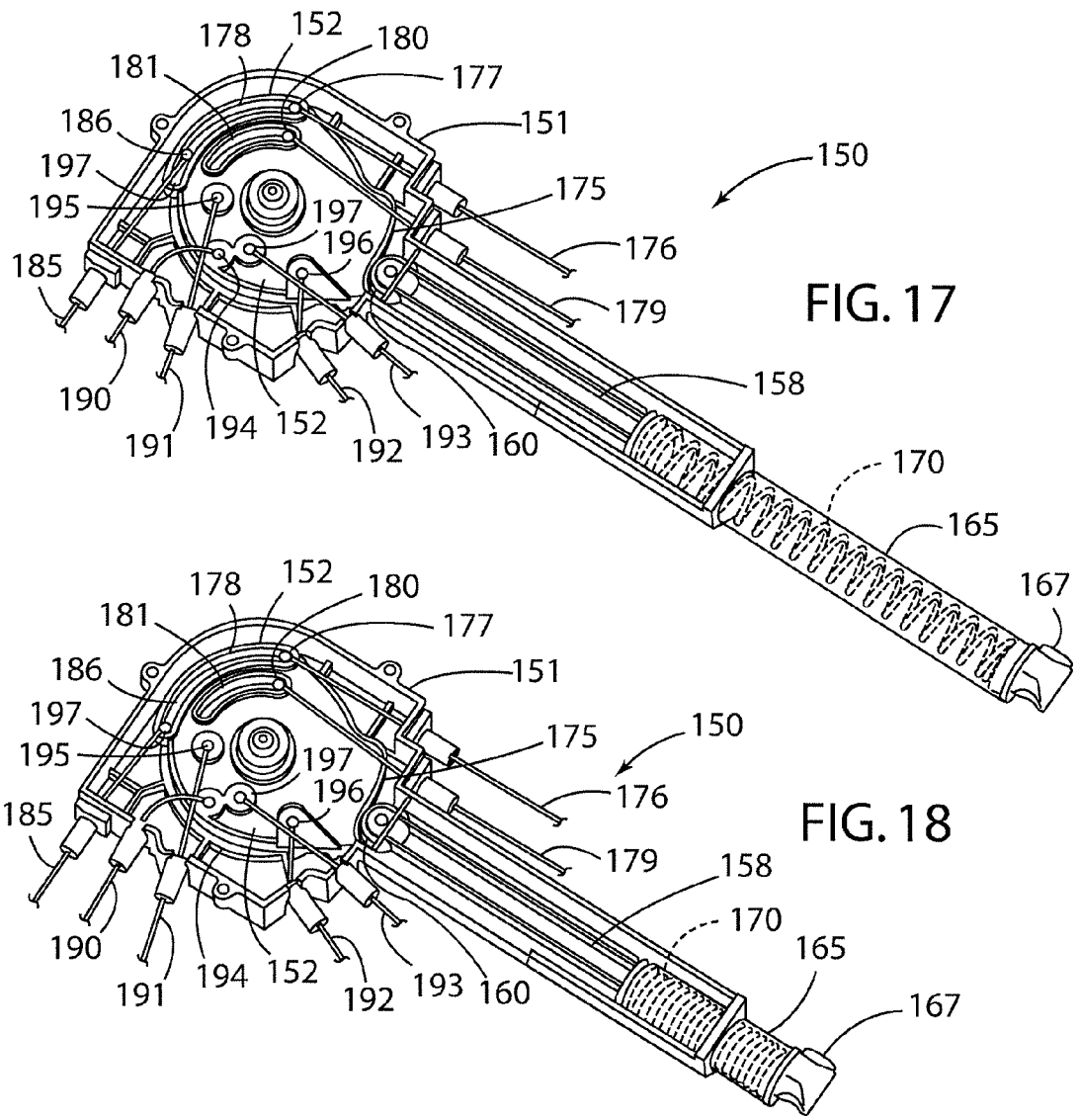

CONTROL MECHANISM

CROSS-REFERENCE TO RELATED APPLICATIONS

This application is a continuation-in-part of Ser. No. 11/843,422, filed Aug. 22, 2007, now U.S. Pat. No. 7,631,938 issued on Dec. 15, 2009, which claims the benefit of U.S. Provisional Application No. 60/839,217, filed on Aug. 22, 2006, and U.S. Provisional Application No. 60/885,135, filed on Jan. 16, 2007, both entitled STORED ENERGY CONTROL MECHANISM. The entire contents of all of the above-identified patents and applications are incorporated herein by reference.

BACKGROUND OF THE INVENTION

Various mechanisms for moving and/or folding seats for motor vehicles have been developed. One type of seat that may be used in Sport Utility Vehicles ("SUVs"), vans or the like includes one or more mechanisms that enable the seat back to be folded down, followed by upward and forward rotation of the seat back and base. Such seats provide for increased space for transporting large objects or the like when the rear seats of the vehicle are not needed.

Although such seats have been widely used due to the need for increased space, known mechanisms may not fully assist the user in folding the seat. Thus, known folding seat arrangements may require substantial input of force by a user to fold and/or unfold the seat.

Electrically-powered folding seats have also been developed, but the electrical actuators and related electrical components tend to be more costly than known mechanical mechanisms. Due to the added complexity, weight, and extra expense, powered folding seats have had somewhat limited acceptance in the marketplace.

SUMMARY OF THE INVENTION

The present invention relates to an energy storage mechanism that can be utilized to assist in folding a vehicle seat. The mechanism may be utilized in a wide range of other applications as well. The mechanism may include a cam that rotates to move cables that are, in turn, utilized to release a mechanism such as a latch, lock, or the like. The mechanism may be released by a relatively small user input force and movement such as movement of a release lever or the like, yet provide for a relatively large output force acting over a relatively large range of movement. If the mechanism is utilized to assist in movement of a vehicle seat to a folded position, the mechanism stores energy as the seat is folded downwardly to a use position, and releases the energy to assist in moving the seat from a use position to a folded position.

These and other features, advantages, and objects of the present invention will be further understood and appreciated by those skilled in the art by reference to the following specification, claims, and appended drawings.

BRIEF DESCRIPTION OF THE DRAWINGS

FIG. 4 is a cross-sectional view of the energy storage mechanism in a first position;

FIG. 5 is a cross-sectional view of the energy storage mechanism in a second position;

FIG. 6 is a cross-sectional view of the energy storage mechanism in a third position;

FIG. 7 is a cross-sectional view of the energy storage mechanism in a fourth position;

FIG. 8 is a cross-sectional view of the energy storage mechanism in a fifth position;

FIG. 17 is an isometric view of the energy storage mechanism of FIG. 16 wherein the mechanism is in an extended position;

FIG. 18 is an isometric view of the mechanism of FIG. 17 wherein the mechanism is in a retracted position;

DETAILED DESCRIPTION OF PREFERRED EMBODIMENT

Figure 3:
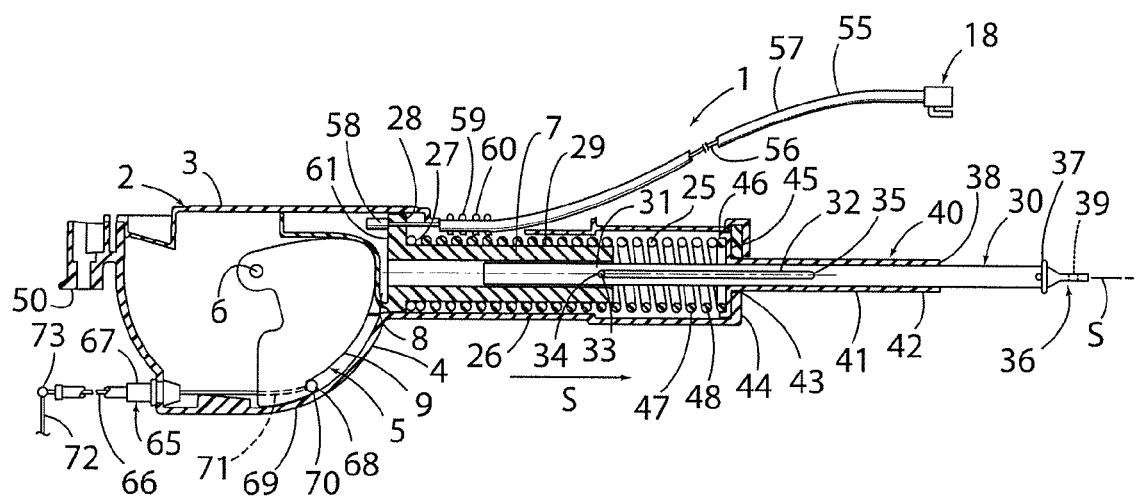
FIG. 3 is a cross-sectional view of an energy storage mechanism according to one aspect of the present invention.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
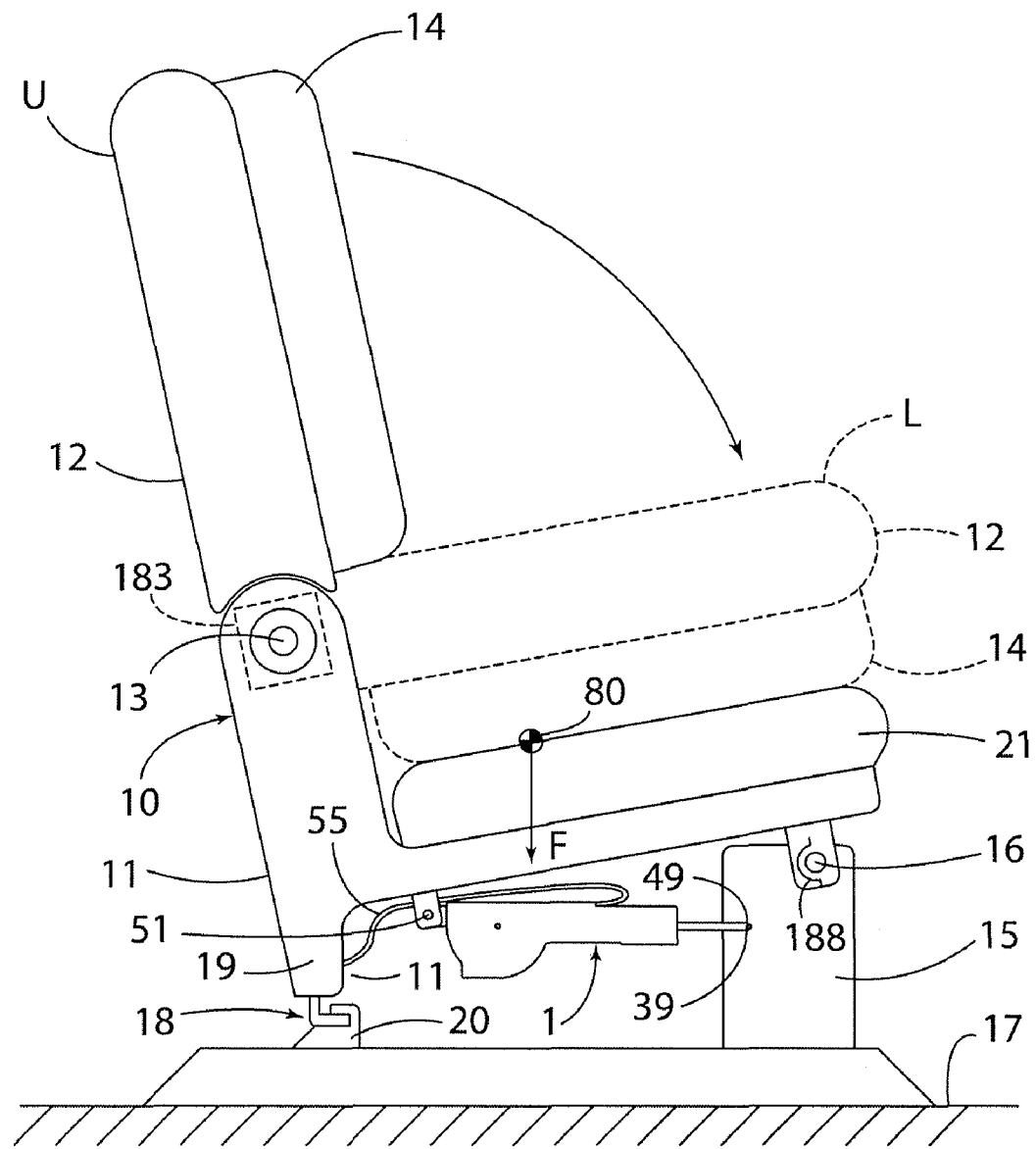
FIG. 1 is a partially schematic side view of a folding seat for vehicles and the like including an energy storage mechanism according to one aspect of the present invention.

With reference to FIG. 1, an energy storage mechanism 1 according to one aspect of the present invention may be mounted in a folding vehicle seat assembly 10. Mechanism 1 provides an axial force tending to move (rotate) the seat assembly 10 from the use position of FIG. 1 to the folded position shown in FIG. 2, and also assists in moving the seat in a controlled manner from the folded configuration of FIG. 2 back to the use position of FIG. 1. As described in more detail below, energy storage mechanism 1 is capable of generating a force that assists a user in folding and unfolding the seat assembly 10, without requiring the use of powered actuators or the like.

Seat assembly 10 includes a seat base structure 11 and a seat back structure 12 that is pivotally mounted to the base structure 11 at a pivot 13. The seat back 12 and cushion 14 can be pivoted about pivot 13 from an upright position "U" to a lowered position "L". A seat cushion 21 is secured to the seat base structure 11. When the seat back structure 12 is folded forward, the back cushion 14 may contact the seat cushion 21 as shown in dashed lines in FIG. 1, and in solid lines in FIG. 2. Pivot 13 includes a pivoting/latching mechanism (not shown) of a known design that may be releasable to permit pivoting of the back 12 and cushion 14 from the upright position U.

Figure 2:
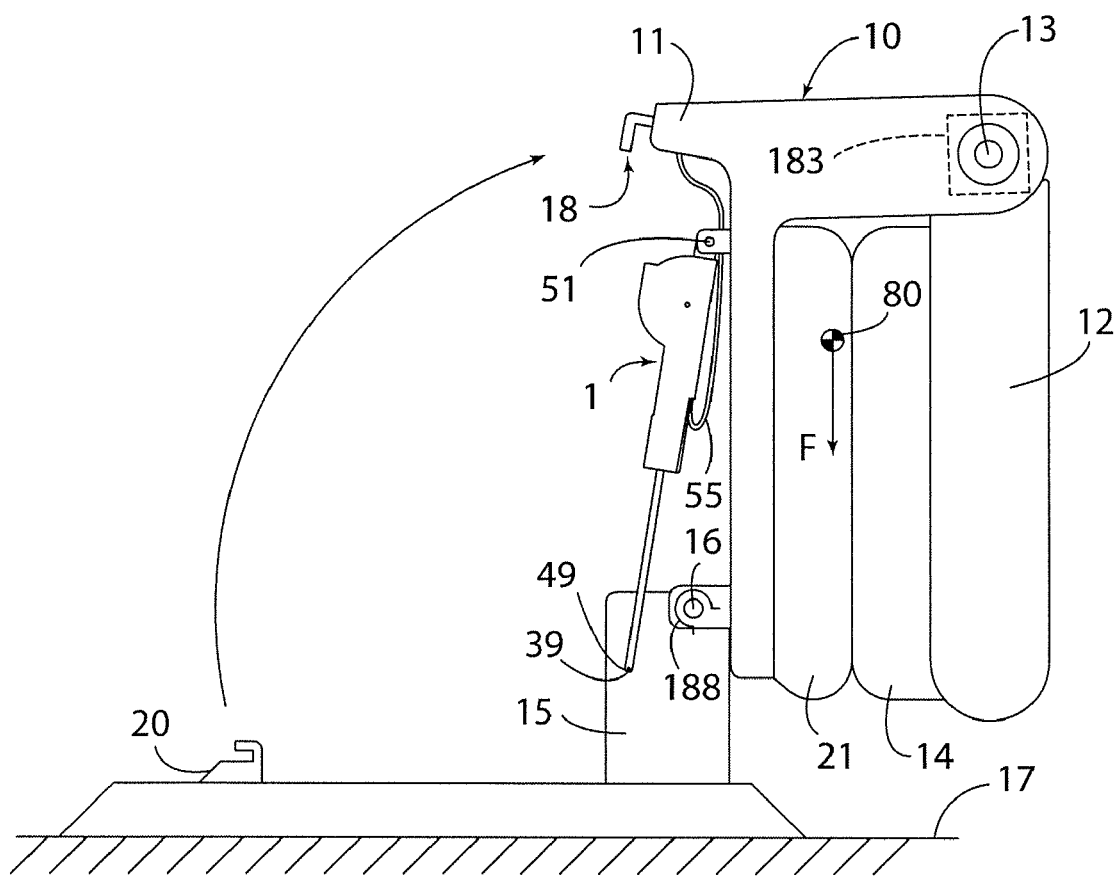
FIG. 2 is a partially schematic side view of the folding seat of FIG. 1 wherein the seat is in the folded configuration.

The seat base structure 11 is pivotably mounted to a fixed seat support bracket/structure 15 at pivot 16. The folding vehicle seat assembly 10 may include a torsion spring (not shown) of a known design acting about the pivot 16 tending to shift the seat from the use configuration of FIG. 1 to the folded configuration of FIG. 2. Prior folding seats included a pair of such torsion springs as well as dampening devices to control the rate of rotation of the seat as moving from position 1 to position 2. However, the energy storage mechanism 1 permits elimination of one or both of the torsion springs previously used at pivot 16 as well as any dampeners used to control the rate of rotation of the seat, thereby reducing the complexity and attending cost of the folding seat assembly 10. The fixed structure 15 is securely connected to vehicle floor structure 17. A releasable latch mechanism 18 securely yet releasably interconnects a rear portion 19 of seat base structure 11 to a fixed latch component 20 fixed to vehicle floor structure 17 to selectively prevent rotation of seat base 11 about pivot 16. The pivoting and latching mechanism 13 is connected to the latch mechanism 18 by a known device such as a rigid link, Bowden cable, or other suitable arrangement. As discussed in more detail below, the releasable latch mechanism 13 is operably connected to mechanism 1 by a cable assembly 55, and actuation (release) of mechanism 1 causes mechanism 1 to selectively release latch 13 to initiate the rotation of the back 12 and cushion 13 from position U to position L. Upon completion of this rotation the mechanism at pivot 13 then transmits the remaining energy from mechanism 1 to selectively release latch 18 to permit rotation of seat base 11 from the use position (FIG. 1) to the folded configuration (FIG. 2). The releasable latch mechanisms 13 and 18 may be of a known design, such that they will not be described in detail herein.

With further reference to FIG. 3, an energy storage mechanism 1 according to one aspect of the present invention includes a housing 2 having a first part 3 that is interconnected to a second part 4 during assembly of the energy storage mechanism 1. A cam 5 is pivotally mounted in the housing 2 for rotation about a pivot 6. As described in more detail below, a first movable spring engagement part 7 includes a cam follower portion 8 that slideably contacts cam outer surface 9 to shift the first movable spring engagement part 7 along axis "S" upon rotation of cam 5.

A coil spring 25 is mounted within a cylindrical portion 26 of housing 2, and a first end 27 of coil spring 25 bears against an annular surface 28 of first movable spring engagement part 7. Coil spring 25 is coiled about a cylindrical portion 29 of first movable spring engagement part 7. It will be understood that other resilient members and/or devices such as gas springs or the like could be utilized instead of coil spring 25.

An elongated rod 30 is slideably received in a cylindrical bore 31 of first movable spring engagement part 7 for movement along axis S relative to first movable spring engagement part 7. A pin 33 is fixed to first movable spring engagement part 7, and extends transversely through elongated slot 32 in elongated rod 30. Pin 33 thereby limits the travel of elongated rod 30 relative to first movable spring engagement part 7. When the rod 30 is in the fully extended position relative to the first movable spring engagement part 7 (FIG. 3), pin 33 is in contact with a first end 34 of elongated slot 32 and prevents further extension of elongated rod 30. As described in more detail below, in operation, elongated rod 30 may be pushed inwardly into bore 31 of first movable spring engagement part 7, and contact between pin 33 and second end 35 of elongated slot 32 limits the travel of elongated rod 30 when it is pushed into bore 31 of first movable spring engagement part 7. Alternately, an annular flange or ridge 37 of rod 30 contacts end 38 of tubular portion 41 of a second movable spring part 40 to limit inward travel of rod 30 relative to part 40.

Second movable spring engagement part 40 includes elongated tubular portion 41 having a cylindrical bore 42 that slideably receives elongated rod 30. Tubular portion 41 of second movable spring engagement part 40 is slideably received in an aperture or opening 43 in an end piece 44 that is mounted to housing 2. The second movable spring engagement part 40 includes a disc-shaped end 45 disposed in a cylindrical cavity portion 47 of housing 2 in contact with second end 48 of coil spring 25. An annular flange 46 cups and locates end 48 of coil spring 25, and thereby ensures that the coil spring 25 bears against disc-shaped end 45 of second movable spring engagement part 40.

When the cam 5 of mechanism 1 is in the position illustrated in FIG. 3, the coil spring 25 bears against disc-shaped end 45 of second movable spring engagement part 40, thereby biasing the second movable spring engagement part 40 into the position illustrated in FIG. 3. In this position, the disc-shaped end 45 of second movable spring engagement part 40 bears against end piece 44, and end piece 44 acts as a stop that limits the outward travel of second movable spring engagement part 40 relative to housing 2. End 36 of elongated rod 30 further includes an opening 39 forming a connector that can be utilized to connect the elongated rod 30 to fixed structure 15 at a pivot point 49 (FIG. 1). Housing 2 further includes a connector 50 that pivotably mounts mechanism 1 to seat base 11 at pivot 51 (FIG. 1).

A first Bowden cable assembly 55 operably connects first movable spring engagement part 7 to latch mechanism 13. Cable assembly 55 includes an inner cable 56, and an outer tube or sheath 57. A fitting 59 secures end portion 60 of outer sheath 57 to the mechanism housing 2, and an end fitting 58 attached to inner cable 56 is secured to first movable spring engagement part 7 at a connector 61. As described in more detail below, movement of first movable spring engagement part 7 shifts the inner cable 56 of first Bowden cable assembly 55 to thereby selectively release the releasable latch mechanism 13.

A manual or electrical operating/release device such as lever 72 or the like is operably connected to mechanism 1 by a second Bowden cable assembly 65. Cable assembly 65 includes an inner cable 66, and a sheath 67. A first end fitting 68 is fixed to a first end 69 of inner cable 66. The end fitting 68 engages a stop surface 70 on cam 5 adjacent cam surface 9, and inner cable 66 passes through a slot 71 in cam 5 to form a lost motion mechanism. The slot 71 has a downwardly-opening U-shape in cross section, such that, in operation, the end fitting 68 and inner cable 66 can disengage completely from the cam 5 as cam 5 rotates to the position shown in FIGS. 5 and 6. A second end 73 of inner cable 66 is connected to a release mechanism such as a lever 72 or the like that can be manipulated by a user to pull on inner cable 66.

With further reference to FIG. 4, in use, a cycle starts with the mechanism 1 in the fully contracted position with elongated rod 30 fully inserted into tubular portion 41 of second movable spring engagement part 40. In this position, second movable spring engagement part 40 is shifted to the innermost position illustrated in FIG. 4, and cam 5 is in the forwardly-rotated position illustrated in FIG. 4. In this position, spring 25 is fully compressed (relative to the other operating states described in more detail below). The configuration of FIG. 4 corresponds to the seat position illustrated in FIG. 1, wherein the seat base structure 11 is in the lowered position, and latch mechanism 18 is engaged to secure the vehicle seat assembly 10 to the vehicle floor structure 17.

To fold the seat assembly 10 from the position illustrated in FIG. 1 to the position illustrated in FIG. 2, a user actuates release mechanism 72 to shift inner cable 66 of second cable assembly 65 in the direction of the arrow "C1". Movement of cable 66 causes end fitting 68 to pull against stop surface 70 of cam 5, thereby causing cam 5 to begin rotating about axis 6 in the direction of the arrow "R". As the cam 5 rotates, the cam surface 9 slides against cam follower surface 8 of first movable spring engagement part 7, with spring 25 biasing cam follower surface 8 into engagement with cam surface 9. As the cam 5 rotates in the direction of the arrow "R", the end portion or lobe 75 of cam 5 slides along cam follower surface 8 until the end portion 75 travels beyond a line "L1" passing through the pivot axis 6 of cam 5. Once the end portion 75 travels beyond the point L1, the contact point between cam follower surface 8 and cam surface 9 is offset below line L1, such that the force of coil spring 25 acting on cam 5 creates a moment tending to rotate the cam 5 in the direction of the arrow "R". The moment generated by coil spring 25 causes cam 5 to rotate as coil spring 25 expands until the cam 5 reaches the rearwardly-rotated position illustrated in FIG. 5. As discussed above, slot 71 in cam 5 has an outwardly-opening U-shape in cross section. This permits the cable end 68 and cable 66 to disengage from cam 5 as shown in FIG. 5, such that the cam 5 can rotate in the direction of the arrow "R" under the force of expanding coil spring 25 while inner cable 66 remains stationary. Housing 2 preferably includes a retainer portion 76 that retains the cable and fitting 66 in the position illustrated in FIG. 5 after it is disengaged from the stop surface 70 of cam 5. A stop surface 62 of housing 2 contacts side surface 63 of cam 5 to prevent rotation of cam 5 beyond the position of FIG. 5. As first movable spring engagement part 7 shifts relative to elongated rod 30, pin 33 of first movable spring engagement part 7 moves from second end 35 of slot 32 to a central portion of slot 32 as shown in FIG. 5.

As the first movable spring engagement part 7 shifts from the position illustrated in FIG. 4 to the position illustrated in FIG. 5, it pulls the end fitting 58 of inner cable member 56, thereby releasing the latch mechanisms 13 and 18. Release of the latch mechanism 18, in turn, permits the seat base structure 11 to be rotated upwardly from the position illustrated in FIG. 1 to the position illustrated in FIG. 2.

It will be appreciated that the mechanism 72 and cable 66 do not need to move very far to cause the cam 5 to release and thereby cause the first spring engagement part 7 to travel a relatively large distance as it moves from the position illustrated in FIG. 4 to the position illustrated in FIG. 5. Movement of first spring engagement part 7 thereby provides a relatively large input movement to releasable latch 18 via cable 55, even though the user may provide a relatively small movement at release device/lever 72. Also, the amount of force required to actuate device/lever 72 to rotate the cam 5 far enough to cause coil spring 25 to begin rotating the cam 5 is relatively low. Nevertheless, as the cam 5 rotates due to the force generated by coil spring 25, the force acting on inner cable 56 and latch 18 is quite large.

Figure 9:
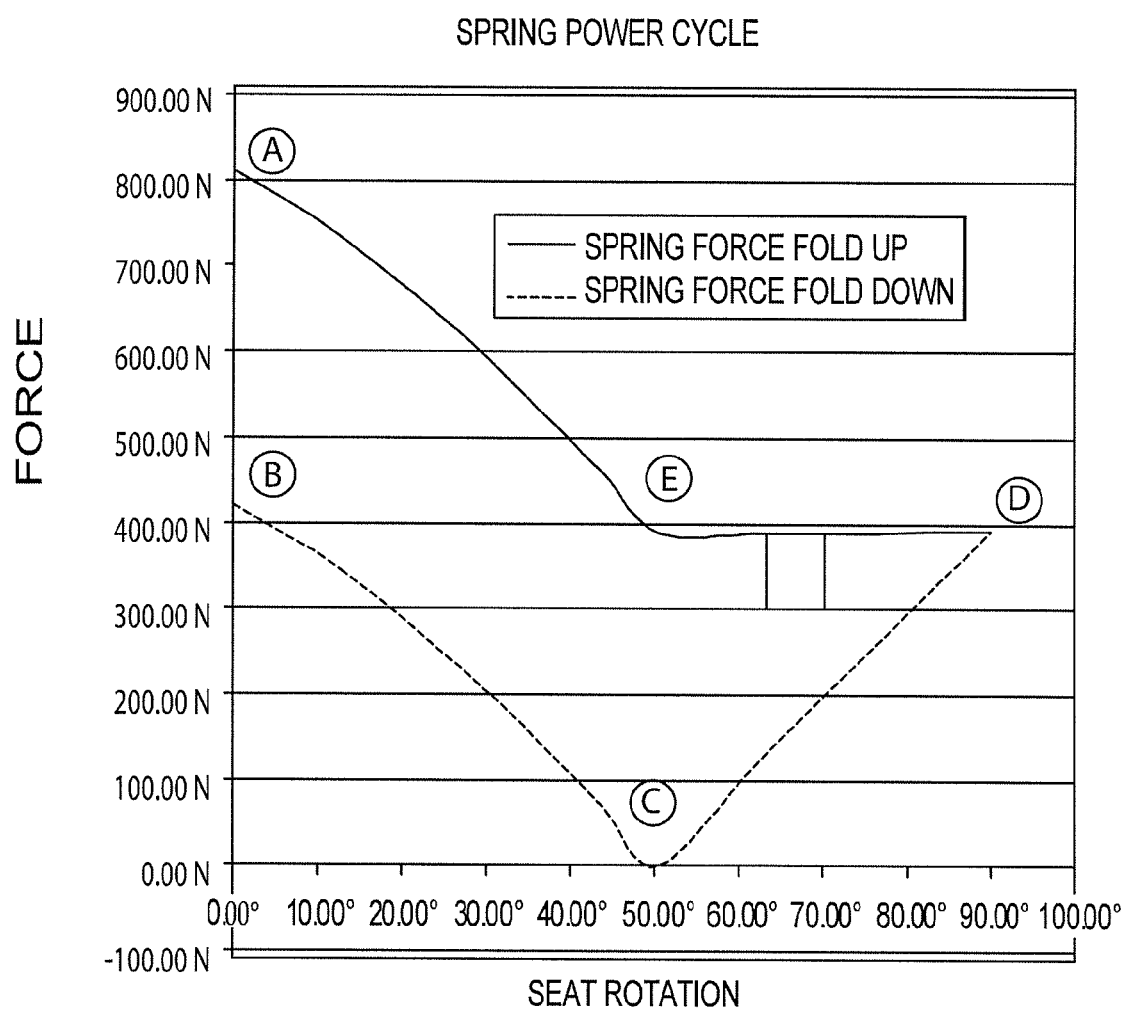
FIG. 9 is a graph showing the force generated by the energy storage mechanism.

With further reference to FIG. 9, as the mechanism shifts from the configuration of FIG. 4 ("circle A") to the configuration of FIG. 5 ("circle B"), the seat base 11 does not rotate. However, the amount of force generated by the coil spring 25 drops significantly due to the expansion of coil spring 25.

After the latch mechanism 18 is released, the mechanism 1 begins to assist upward rotation of seat base 11 by expanding length-wise as it shifts from the configuration illustrated in FIG. 5 to the configuration illustrated in FIG. 6. As the mechanism shifts from the configuration of FIG. 5 to the configuration of FIG. 6, the second movable spring engagement part 40 is shifted outwardly as coil spring 25 expands, and the seat base 11 rotates upwardly. As second movable spring engagement member 40 moves outwardly from the position of FIG. 5 to the position of FIG. 6, end 38 of part 40 bears against annular ridge 37 of rod 30, and thereby pushes rod 30 outwardly. Movement of rod 30 relative to first spring engagement part 7 causes pin 33 of part 7 to shift from a central portion of elongated slot 32 as shown in FIG. 5 to the end 34 of slot 32 shown in FIG. 6. With reference to FIG. 9, when the mechanism 1 is in the configuration illustrated in FIG. 6 ("circle C"), the coil spring 25 is fully extended, and the coil spring 25 does not generate force tending to further rotate the seat base 11. At this point, the seat base 11 is at a rotation angle of about fifty degrees relative to the use position of zero degrees (FIG. 1). At about mid rotation, the center of gravity 80 (FIGS. 1 and 2) of the moving portion (i.e., base 11 and back 12) of the seat assembly passes over the pivot point 16, such that the seat base 11 and back 12 will tend to continue moving toward the folded position of FIG. 2 due to the moment generated due to the center of gravity being forward of the pivot point 16. Also, as the seat base 11 and back 12 are moved from the use configuration (FIG. 1) to the folded configuration (FIG. 2), the momentum of the moving components will tend to cause the parts to continue moving even after mechanism 1 is not generating a force on seat base 11. As the center of gravity passes over the pivot point 16, the momentum of the seat assembly will therefore tend to continue the rotation of the moving seat components. Thus, the combined effects of the moment caused by the position of the center of gravity and the momentum of the components tends to cause the seat to rotate to the fully folded position of FIG. 2.

As the seat base 11 continues to rotate past fifty degrees relative to the starting position, the mechanism 1 shifts from the configuration illustrated in FIG. 6 to the configuration illustrated in FIG. 7. During this portion of the operation, the elongated rod 30 is pulled out of the elongated tubular portion 41 of second movable spring engagement part 40, and the pin 33 pulls the first movable spring engagement part 7 outwardly due to contact of pin 33 with the second end 35 of elongated slot 32 in elongated rod 30. Movement of the first movable spring engagement part 7 causes the cam follower surface 8 to move in the direction of the arrow "S1" along axis S. A torsion spring (not shown) biases the cam 5 in a counterclockwise direction (i.e., opposite the arrow "R") (FIG. 4). As the cam follower surface 8 moves in the direction of the arrow "S", the cam 5 rotates from the rearward position shown in FIG. 6 to the forward position shown in FIG. 7. As the coil spring 25 is compressed, the force generated by the coil spring 25 shifts from zero ("circle C") (FIG. 9) to the "circle D" position of FIG. 9.

As discussed above, the moving seat components 11 and 12 have stored energy due to the momentum initially generated by expansion of coil spring 25 in moving from the configuration of FIG. 5 to the configuration of FIG. 6, and the seat also generates a moment about pivot 16 (FIG. 2) because the center of gravity 80 is forward of the pivot 16. The combination of the moment due to the center of gravity 80 being forward of pivot 16, and the energy stored in the moving seat components compress the coil spring 25 as the mechanism shifts from the configuration of FIG. 6 to the configuration of FIG. 7. In this way, the mechanism 1 again stores some of the energy by compressing coil spring 25 as the seat reaches the fully folded position illustrated in FIG. 2. It will be apparent that the energy stored by spring 25 as it is compressed during the final portion of the movement to the position of FIG. 2 acts as a cushion to slow the rotation of the seat components just prior to reaching the folded configuration.

To shift the seat from the fully folded position illustrated in FIG. 2, wherein the mechanism 1 is in the configuration illustrated in FIG. 7, a user pulls on the seat to rotate it about the pivot axis 16. Initially, the mechanism 1 shifts from the configuration illustrated in FIG. 7 to the configuration illustrated in FIG. 8 due to the elongated rod 30 sliding into the cylindrical portion 41 of second movable spring engagement part 40. During this movement, pin 33 slides from end 34 of slot 32 (FIG. 7) to a central portion of slot 32 (FIG. 4). The force required to slide elongated member 30 in tubular portion 41 of second movable spring engagement part 40 may be controlled to provide the desired degree of resistance. For example, the force may be controlled by providing a tight or loose fit between the elongated rod 30 and the elongated portion 41 and by controlling the frictional coefficients of the materials used. Also, the force generated during motion of elongated rod 30 relative to the cylindrical portion 41 may include a damping component. The damping component may be due to (for example) air moving between the elongated rod 30 and the cylindrical portion 41. Thus, the force required to move elongated rod 30 relative to cylindrical portion 41 of second movable spring engagement part 40 may include a frictional component that is an approximately constant force, and it may also include a component that is a linear (or non-linear) function of velocity to provide damping.

As the seat assembly moves from the configuration of FIG. 2 to the configuration of FIG. 1, the elongated rod 30 reaches the position illustrated in FIG. 8, and the flange 37 of elongated rod 30 bears against end 38 of cylindrical portion 41. The second movable spring engagement part 40 then moves from the configuration illustrated in FIG. 8 to the configuration in FIG. 4, thereby compressing coil spring 25. As rod 30 moves relative to part 7, pin 33 moves from a central portion of slot 32 (FIG. 8) of rod 30 to end 35 of slot 32 (FIG. 4). Once the seat assembly returns to the position illustrated in FIG. 1, the coil spring 25 is fully compressed as illustrated in FIG. 4. At this point, a user can repeat the cycle by releasing the cam 5 by manipulating release mechanism 72 as described above.

Figure 10:
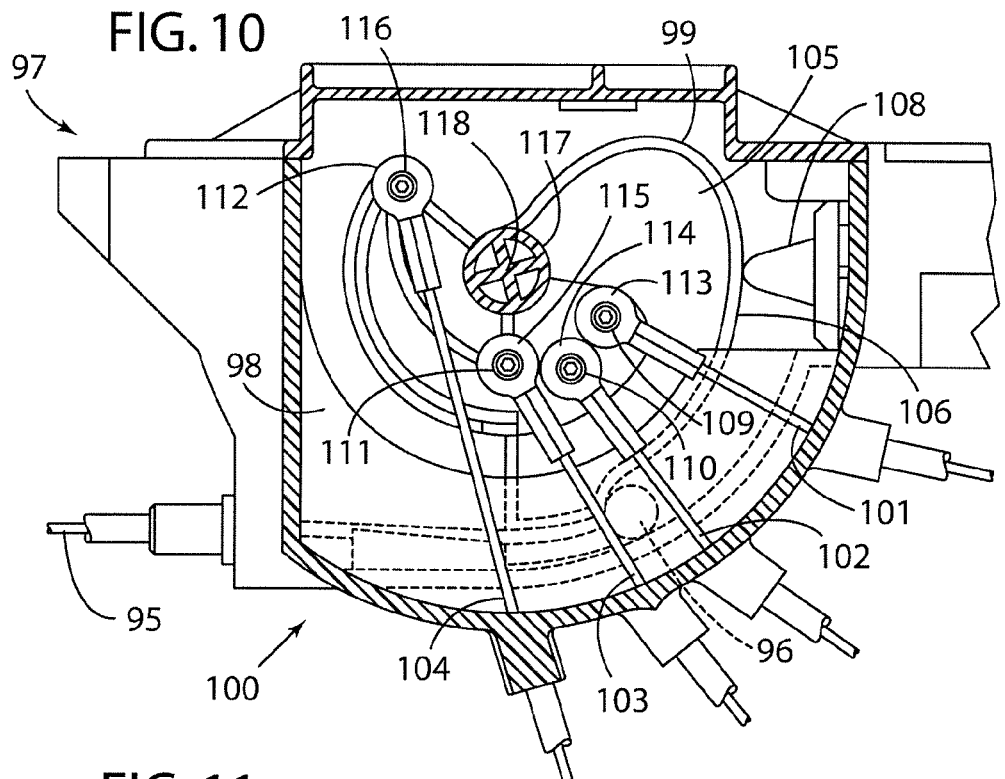
FIG. 10 is a partially fragmentary cross-sectional view of a portion of a mechanism according to another aspect of the present invention.
Figure 11:
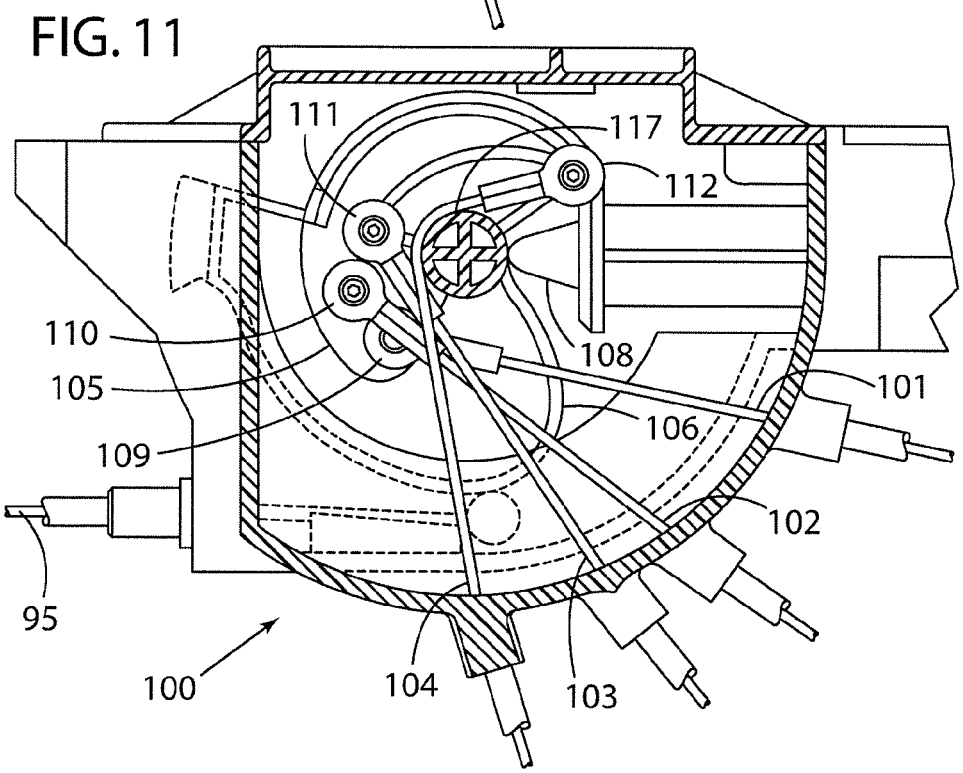
FIG. 11 is a partially fragmentary cross-sectional view of the mechanism of FIG. 10 showing the cam in a rotated position.

With further reference to FIGS. 10 and 11, a mechanism 100 according to another aspect of the present invention is similar to the energy storage mechanism 1 described above, except that the mechanism 100 includes an arrangement whereby one or more cables 101 are connected directly to a cam 105, rather than to a component such as the first movable spring engagement part 7 that moves with a cam follower. Cam 105 of mechanism 100 includes a cam surface 106 that is cycloidal in shape. A cam follower 108 slideably engages the cam surface 106 to compress a spring (not shown) in substantially the same manner as the spring 25 discussed in detail above in connection with the mechanism 1. Although cam surface 106 could have a variety of shapes, a cycloidal shape is presently preferred because the rate of change of the radius defined by the cam surface 106 is somewhat lower than the cam surface 9 of mechanism 1, and the cam 105 therefore does not release as rapidly, such that the noise and vibration upon actuation of the mechanism is reduced. Cam 105 includes raised bosses 109, 110, 111 and 112. An end fitting 113 connects cable 101 to boss 109, and an end fitting 114 interconnects cable 102 to boss 110. Similarly, a fitting 111 connects cable 103 to boss 111, and a fitting 116 connects cable 104 to boss 112.

An end 96 of a release cable 95 is operably interconnected to cam 105 by a lost motion mechanism that is substantially similar to the arrangement described in detail above in connection with the mechanism 1 (FIG. 3). Housing 97 of mechanism 100 includes a wall portion 98 that separates the end portion and end fitting 96 of cable 95 from the cables 101-104.

In use, a user generates a force on cable 95 tending to rotate the cam 105 in a clockwise direction from the position illustrated in FIG. 10. As the cam follower 108 passes over the end lobe surface 99 of cam 105, the force generated by the main spring (not shown) causes the cam follower 108 to rotate the cam 105 in a clockwise direction from the position illustrated in FIG. 10 to the position illustrated in FIG. 11. As the cam 105 rotates, it pulls on the cables 101-104, thereby actuating a plurality of mechanisms. Also, cam 105 includes a hub 117, and one or more of the cables 101-104 wrap around the hub 117 as the cam 105 rotates to the position illustrated in FIG. 11 to thereby ensure that the cables 101-104 are pulled the desired distance. The raised bosses 109-112 may be positioned at different heights along axis 118 of cam 105 to ensure that the cables 101-104 pass over one another when the cam 105 rotates to the position illustrated in FIG. 11.

The mechanism 100 provides for four different outputs, such that the mechanism 100 can actuate four separate latch mechanisms or the like. In the illustrated example, the cables 101 and 102 are each connected to a main latch 18 (FIG. 1), and the cable 103 is operably connected to a latch 13 to release the seat back 12 relative to the base 11. The cable 104 is operably connected to a latch mechanism of a folding headrest (not shown). Such folding headrests and latch mechanisms are known, such that the details of the headrest and headrest mechanism are not described in detail herein.

The position of the bosses 109-112 can be selected to provide the desired amount of travel and force on the cables 101-104 as required to actuate the specific mechanism connected to each of the cables 101-104. Furthermore, the position of the bosses 109-112 also controls the timing of the actuation of the mechanisms connected to the cables 101-104. In the illustrated example, the cables 101 and 102 are both connected to latch mechanisms 18 that secure the seat to the vehicle floor. The cables 101 and 102 actuate the latch mechanisms 18 at virtually the same time. The position of boss 112 is selected to cause cable 104 to actuate the headrest latch mechanism (not shown) quickly, such that the headrest latch is released before the latches 18. The boss 111 is positioned to pull on cable 103 and actuate a latch mechanism at pivot 13 (FIG. 1) immediately after the headrest latch mechanism is actuated, but prior to actuation of the latches 18.

Although mechanism 100 is illustrated as including four bosses that operably connect four different cables to the mechanism 100, the number of cables operably connected to the cam 105 may be varied for a particular application as required to actuate the number of latches utilized in a particular seat design.

Figure 12:
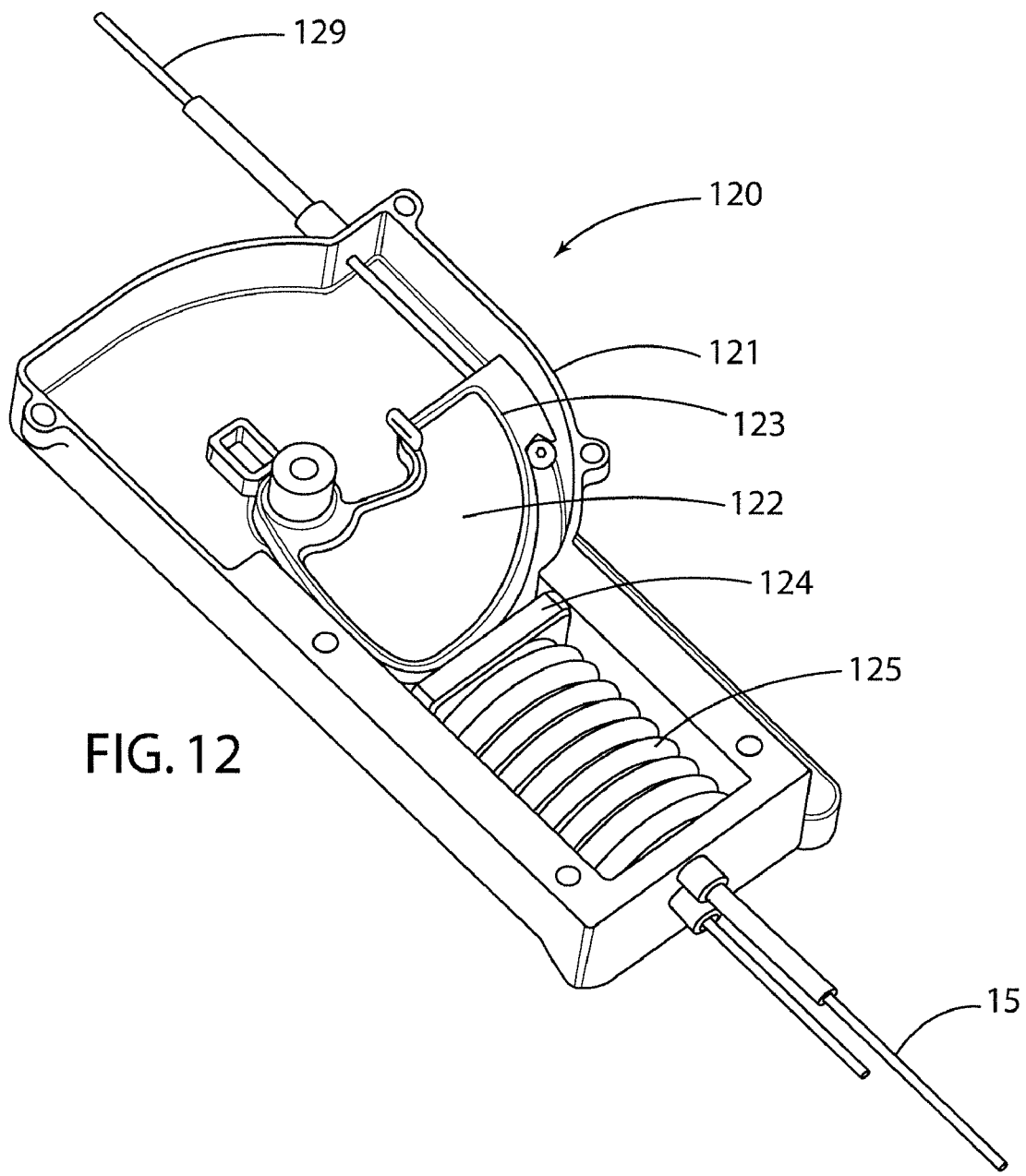
FIG. 12 is an isometric view of an energy storage mechanism according to another aspect of the present invention.
Figure 13:
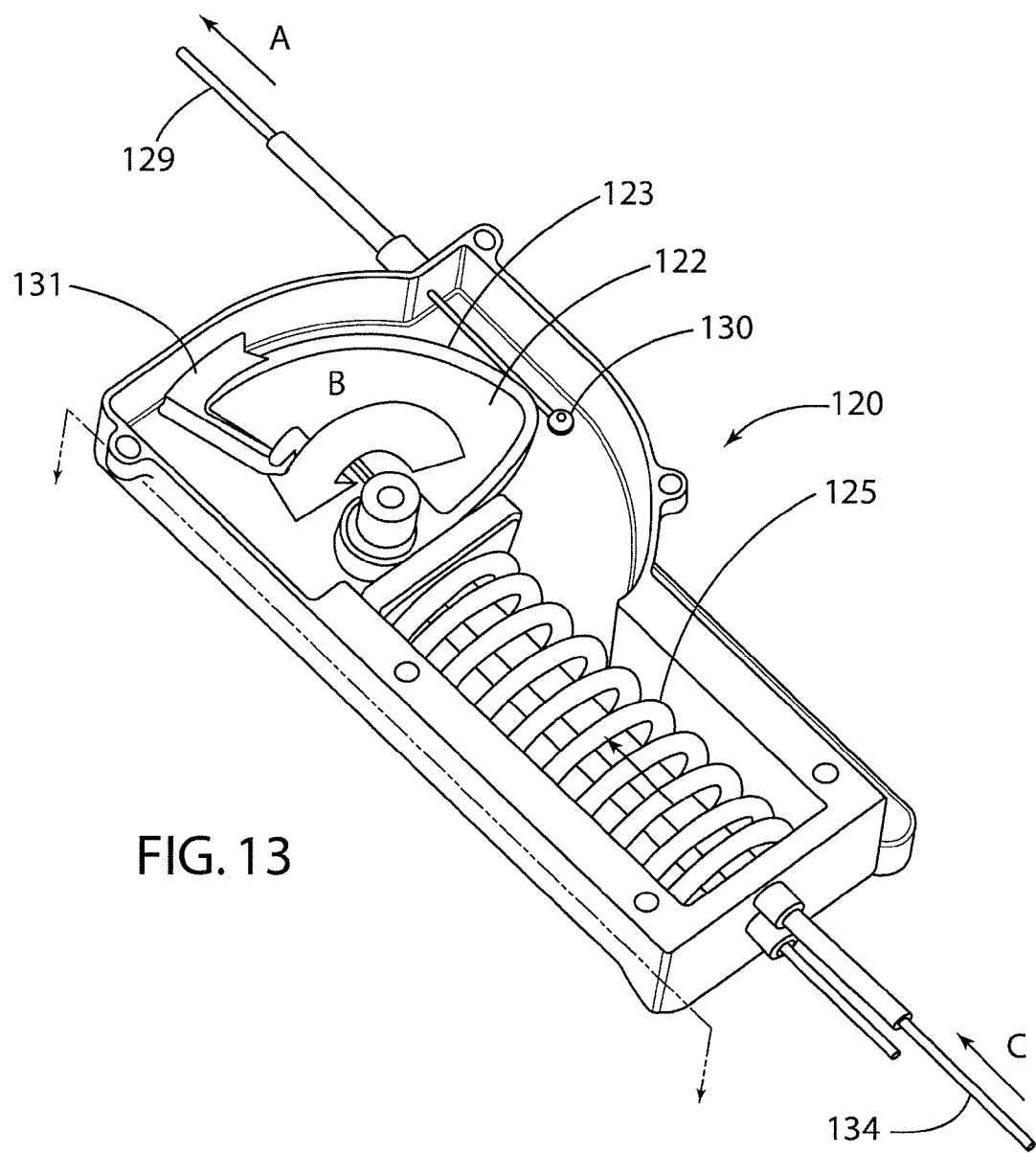
FIG. 13 is an isometric view of the mechanism of FIG. 12.

With further reference to FIG. 12, a mechanism 120 according to another aspect of the present invention includes a housing 121 that pivotably supports a cam 122 defining a cam surface 123 that slideably engages a cam follower 124 that is connected to a coil spring 125. An input cable 129 is operably connected to the cam 122, and rotates the cam 122 in the directions of the arrow B when the input cable 129 is shifted in the direction of the arrow A. In operation, input cable 129 is shifted in the direction of the arrow A, and a "lost motion" interconnection formed by retainer 131 of cam 122 and ball end 130 of cable 129 initially rotates cam 122 through a few degrees of motion from the position illustrated in FIG. 12 as a result of the force of ball end 130 acting on retainer 131 of cam 122. However, after the cam 122 rotates past a few degrees, the action of spring 125 and cam follower 124 on cam surface 123 generates a force on cam 122 causing the cam 122 to rotate in the direction of the arrow B without further movement of ball end 130. As shown in FIG. 13, retainer 131 of cam 122 disconnects from ball end 130 after a few degrees of rotation thereby providing a lost motion interconnection.

The input cable 129 may be actuated manually by a strap, lever, or other manual input device that is positioned to be readily accessible to a user. Alternately, a powered actuator such as a solenoid, electric motor, or the like may also be operably connected to the cable 129 to shift cable 129 and thereby actuate mechanism 120.

Significantly, input cable 129/ball end 130 may move a relatively short distance (e.g., 10 mm), and a relatively small amount of force (e.g., 15-50 Newtons) on cable 129 may be sufficient to cause the cam 122 to shift from the position illustrated in FIG. 12 to the position illustrated in FIG. 13. However, as the spring 125 moves from the compressed position shown in FIG. 12 to the extended position shown in FIG. 13, spring 125 causes output cable 134 to travel a distance in the direction of the arrow C by an amount (e.g., 50 mm) that is substantially greater than that of input cable 129, and also produce a force (e.g., 600-1200 Newtons) that is substantially greater than the force needed to move the input cable 129. Thus, the input forces and/or distances utilized to control/actuate mechanism 120 or substantially less than the output forces and/or distances provided by mechanism 120. Also, the mechanism 120 can be designed to accommodate a wide range of travel requirements and force requirements for the output cable 134 without changing the design of mechanism 120.

Figure 14:
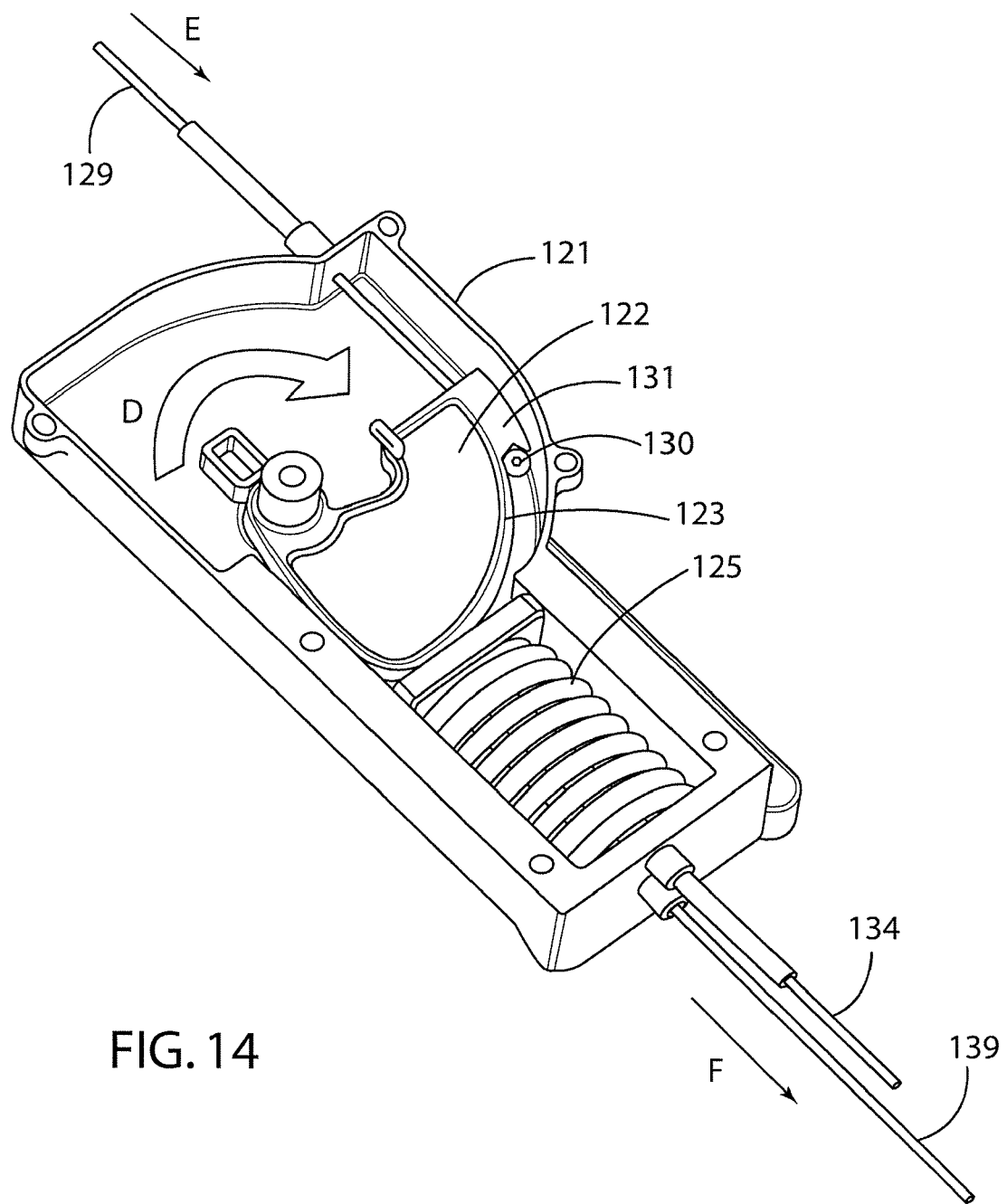
FIG. 14 is an isometric view of the mechanism of FIG. 12.
Figure 15:
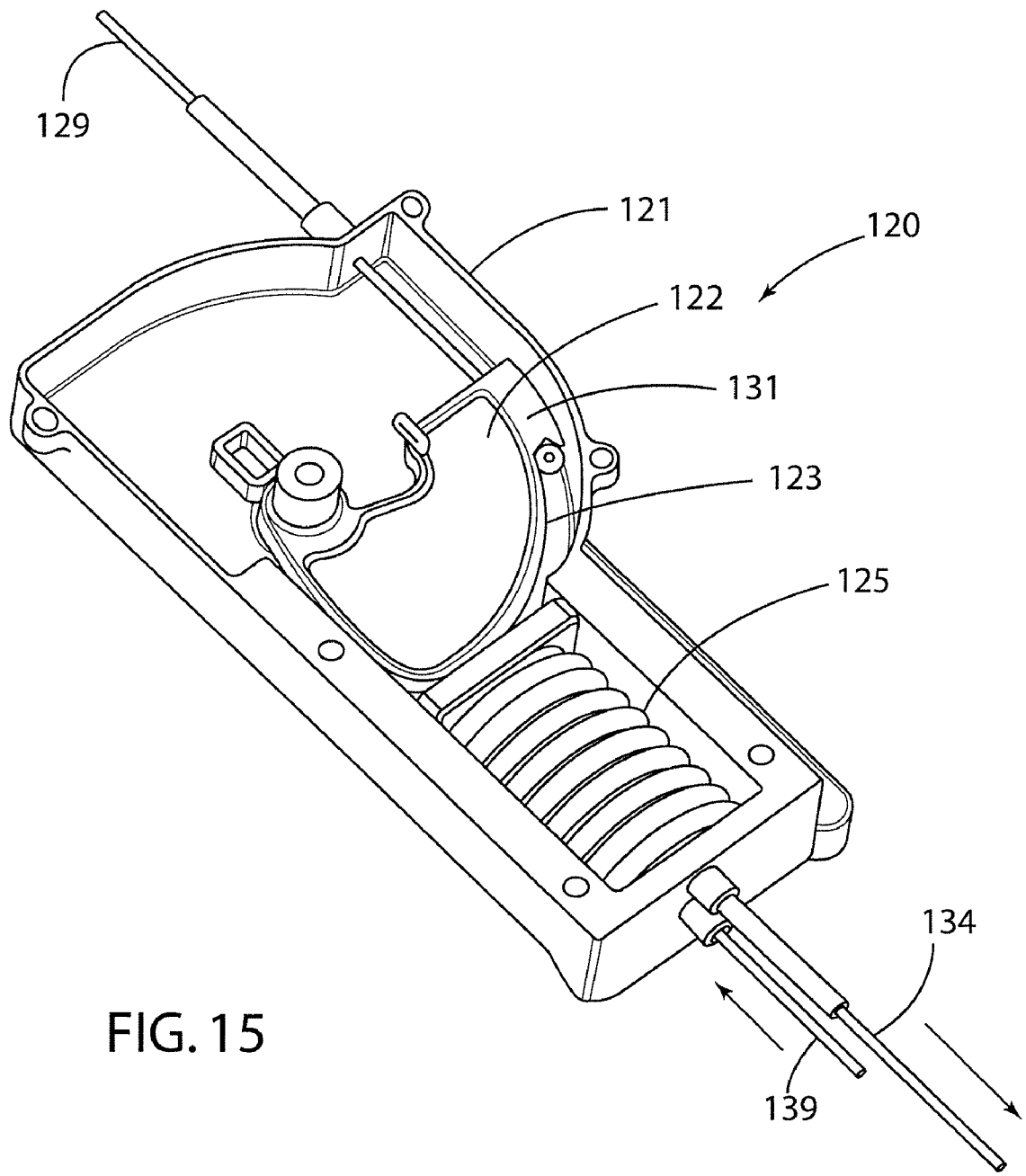
FIG. 15 is an isometric view of the mechanism of FIG. 12.

With reference to FIG. 14, actuation of spring return cable 139 by a force F compresses spring 125, and a torsion spring (not shown) causes cam 122 to rotate in the direction of the arrow D as the spring 125 is compressed. As the cam 122 approaches the start position, ball end 130 of cable 129 engages retainer 131 of cam 122, and causes input cable 129 to shift in the direction of the arrow E. Although mechanism 120 may be utilized in a wide range of applications in a wide range of mounting configurations, in one application the spring return cable 139 is grounded to a stationary connector on a vehicle floor or seat frame, and output cable 134 is operably connected to a movable headrest, armrest, "fold flat" seat, or a "tumble" seat. Movement of the headrest, armrest, or seat compresses spring 125 as the seat or other component is moved to a folded position, causing the mechanism 120 to shift from the state shown in FIG. 13 to the state shown in FIG. 14. Conversely, as the seat or other component unfolds, the spring changes from the compressed configuration shown in FIG. 12 to the extended configuration shown in FIG. 13, and the output force generated by the mechanism 120 assists in unfolding the seat or other component. It will be understood that, in general, the seat or other component need not move from a folded condition to an unfolded condition and vice versa, but may merely shift between two different configurations.

Figure 16:
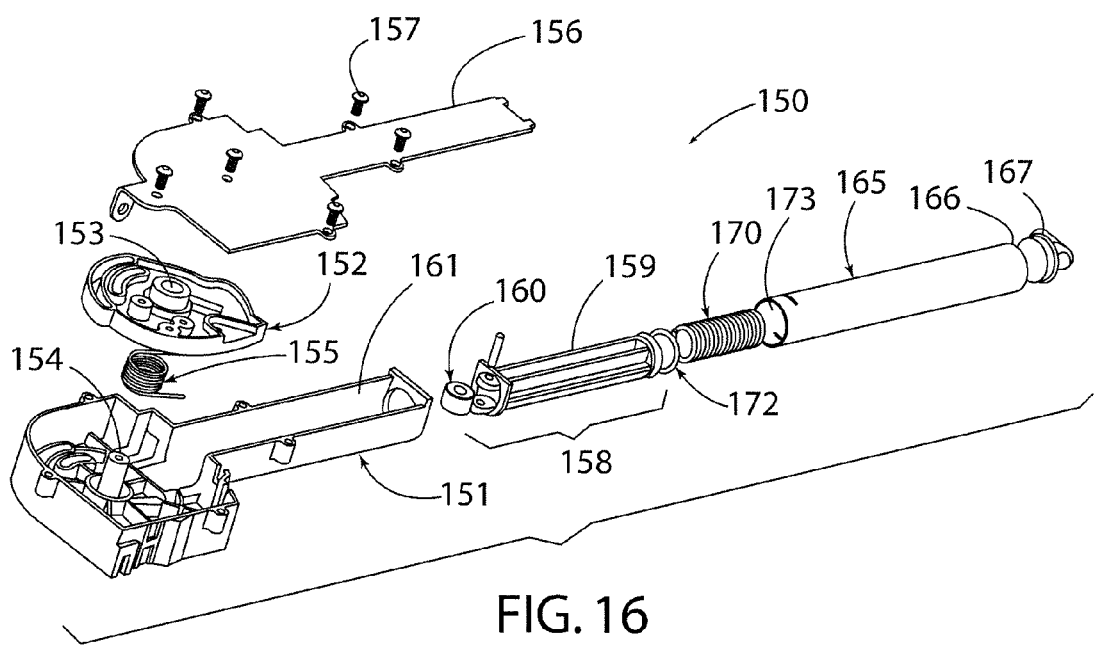
FIG. 16 is an exploded isometric view of an energy storage mechanism according to yet another aspect of the present invention.
Figure 19:
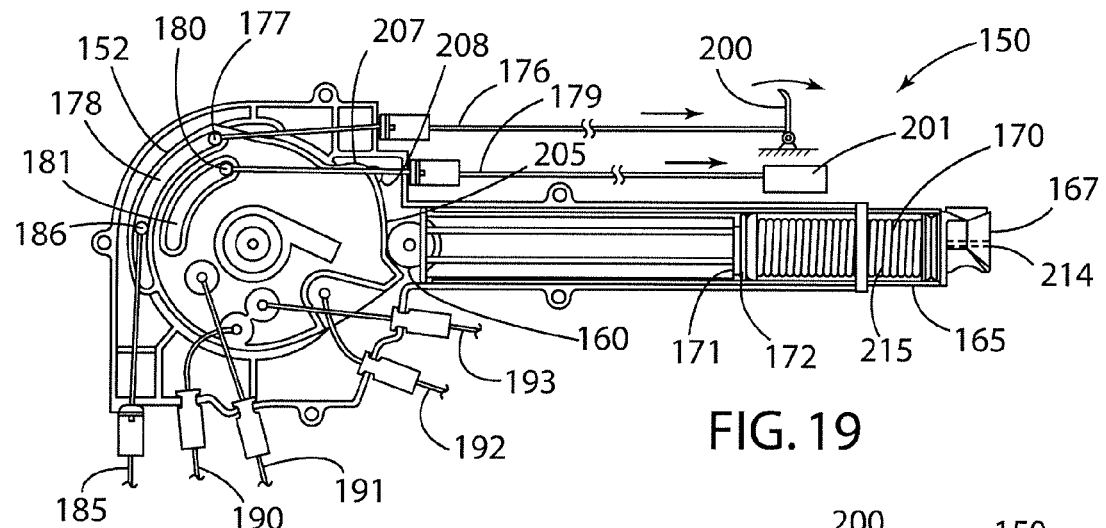
FIG. 19 is a partially schematic side elevational view of the mechanism of FIGS. 16-18 in a retracted position.
Figure 20:
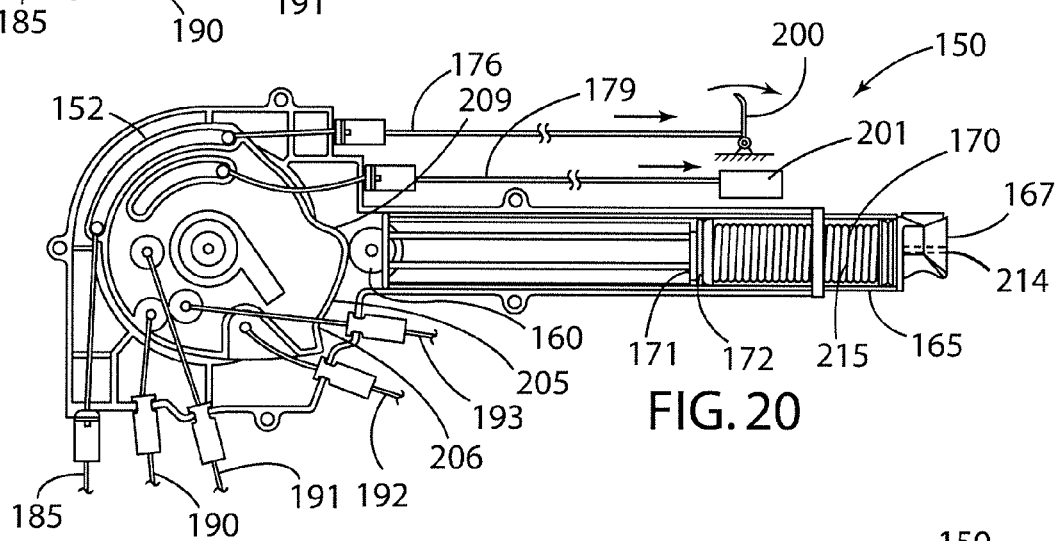
FIG. 20 is a partially schematic view of the mechanism of FIG. 18 immediately prior to release of the cam.
Figure 21:
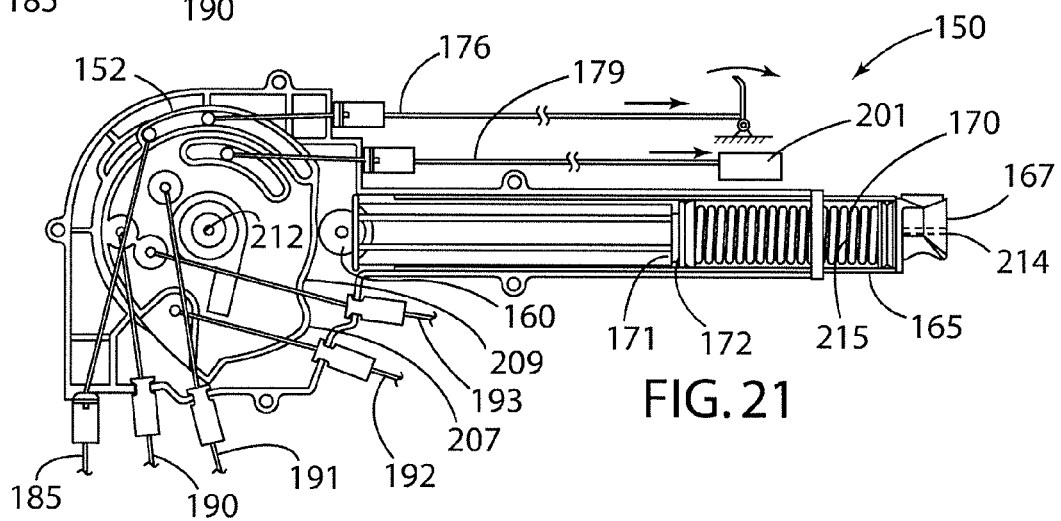
FIG. 21 is a partially schematic side elevational view of the mechanism of FIG. 19 immediately after the cam rotates due to release of the mechanism.

With further reference to FIG. 16, an energy storage mechanism 150 according to yet another aspect of the present invention includes a housing 151, and a cam 152 having an opening 153 that receives a boss 154 of housing 151 when cam 152 is installed in housing 151 to form a pivot 212 (FIG. 21). As described in more detail below, a torsion spring 155 rotatably biases the cam 152 in a counterclockwise direction (when oriented as shown in FIGS. 19-21) relative to housing 151. A cover 156 may be secured to housing 151 utilizing threaded fasteners 157. A cam follower assembly 158 includes an elongated body 159 and a follower wheel 160 that is rotatably mounted to the elongated body 159. An elongated tube 165 includes an outer end 166 to which an end piece 167 is mounted. When assembled, tube 165 is slideably received in elongated portion 161 of housing 151, and elongated body 159 of cam follower assembly 158 is slideably received within tube 165 (see also FIGS. 17 and 18). When assembled, a coil spring 170 contacts outer end 171 of body 159 of cam follower assembly 158, and also contacts end piece 167 fixed to elongated tube 165. The coil spring 170 thereby biases the tube 165 towards an extended position relative to the cam follower assembly 158. An O-ring 172 fits around end 171 of elongated body 159 to secure the O-ring 172 to the elongated body 159. O-ring 172 provides an air-tight, slideable seal between the cam follower assembly 158 and inner surface 173 of tube 165. As described in more detail below, end piece 167 includes a relatively small orifice 214 that controls the flow of air into tube 165 in the region between the end 171 of body 159 and outer end 166 of tube 165. This restriction of air flow limits the rate at which tube 165 will extend relative to cam follower assembly 158 due to the force of coil spring 170.

With further reference to FIGS. 17 and 18, wheel 160 of cam follower assembly 158 rotatably engages cam surface 178 of cam 152. A first release cable 176 includes an end fitting 177 that is received in an arcuate slot 178 of cam 152. Similarly, a second release cable 179 includes an end fitting 180 that is received in an arcuate slot 181 of cam 152. As described in more detail below, the release cables 176 and 179 may be pulled either manually by a release lever 200 or by an electrically powered actuator 201 to rotate cam 152 in a clockwise direction (FIG. 17) to thereby release the mechanism 150.

An interlock cable 185 includes an end fitting 186 that is received in arcuate slot 178 of cam 152. If end fitting 186 engages end 187 of arcuate slot 178, the cable 185 prevents rotation of cam 152 in a clockwise manner that would otherwise occur if a tension force is applied to one or both of the release cables 176 and 179. Interlock cable 185 may be operably connected to the seat back 12 (FIG. 1), such that cable 185 prevents rotation of cam 152 unless the seat back 12 is in the lower position "L". Alternately, the cable 185 may be configured to prevent rotation of cam 152 unless the seat back 12 is sufficiently close to the lower position "L". For example, cable 185 may be operably connected to the seat back 12, such that rotation of cam 152 is prevented unless the seat back 12 is within, for example, thirty degrees or forty-five degrees of the lowermost position "L". As described in more detail below, the interlock cable 185 thereby provides a safety feature to prevent movement of the seat about pivot 16 (FIG. 1) unless the seat back 12 is in the lowermost position "L". Thus, if an object is positioned on the seat 21 such that seat back 12 cannot go to the lowermost position "L", interlock cable 185 prevents release of mechanism 150, and thereby prevents release of release latch mechanism 18.

A plurality of output cables 190, 191, 192, and 193 are connected to the cam 152 at connection points 194, 195, 196, and 197, respectively. As also described in more detail below, rotation of cam 152 in the clockwise direction (FIG. 17) shifts (i.e., pulls) the output cables 190-193 to thereby generate output forces. In the illustrated example, cables 191 and 193 comprise "first stage" cables that move a relatively large distance during the initial rotation of cam 152 from a rest position (FIG. 19) to an intermediate position (FIG. 20). The cables 190 and 192 comprise "second stage" cables that do not move significantly as the cam rotates from the position illustrated in FIG. 19 to the position shown in FIG. 20, but do, however, move significantly as the cam 152 moves from the position shown in FIG. 20 to the position shown in FIG. 21. In the illustrated example, the first stage cables 191 and 193 are utilized to release a conventional pawl and ratchet mechanism 183 (FIGS. 1 and 2) that locks the seat back 12 at a desired angular position about pivot 13 (FIG. 1). The second stage cables 190 and 192 operate to release latch mechanism 18. In general, seat back 12 may include a pair of pawl and ratchet mechanisms, and each first stage cable 191 and 193 connects to one of the pawl and ratchet mechanisms. Similarly, a pair of latch mechanisms 18 may be utilized to latch the seat base structure to the vehicle floor 17, and each second stage output cable 190 and 192 connects to one of the latch mechanism 18.

It will be understood that the location of the connection points 194-197 on cam 152 control the amount of movement of the output cables 190-193 due to rotation of cam 152. Specifically, connection points 194 and 197 are chosen to provide for a relatively large amount of motion of first stage cables 191 and 193 during the rotation of cam 152 from the "rest" position of FIG. 19 to the position of FIG. 20, yet provide relatively little motion of first stage cables 191 and 193 as cam 152 further rotates from the position of FIG. 20 to the position of FIG. 21. Conversely, the connection points 194 and 196 for second stage output cables 190 and 192, respectively, are selected to provide for relatively small movement of cables 190 and 192 as cam 152 moves from the position of FIG. 19 to the position of FIG. 20, while providing for a relatively large amount of movement of second stage output cables 190 and 192 as cam 152 further rotates from the position of FIG. 20 to the position of FIG. 21.

With further reference to FIG. 19, mechanism 150 is in a "rest" or retracted position when the vehicle seat assembly 10 is in the use position illustrated in FIG. 1. Input or release cable 176 may be operably connected to a release lever or latch 200 that can be manually operated by a user to generate a tension on cable 176. Cable 179 may be connected to an electrical actuator 201 that can be actuated by a user to generate a tension on cable 179. In general, manual release lever 200 provides a back up to permit release of mechanism 150 in the event electrical actuator 201 fails. It will be understood that device 150 may utilize only the manual release lever 200 or it may utilize only the electrical actuator 201. As discussed above, end fitting 186 of interlock cable 185 engages arcuate slot 178 in cam 152. Interlock cable 185 may be operably connected to the seat back 12 (FIG. 1), such that fitting 186 prevents rotation of cam 152 beyond the position illustrated in FIG. 20 unless the seat back 12 is in the lowered position "L" (FIG. 1), or in the event the seat back 12 is not sufficiently close to the lowermost position "L". In the illustrated example, the fitting 186 and interlock cable 185 are configured to permit rotation of the cam 152 from the position illustrated in FIG. 19 to the position illustrated in FIG. 20 even if the seat back 12 is not in the lowermost position "L", yet prevent rotation of cam 152 from the position illustrated in FIG. 20 to the position illustrated in FIG. 21 unless seat back 12 is in the lowermost position "L", or sufficiently close thereto. When cam 152 is in the position illustrated in FIG. 19, first stage output cables 191 and 193 prevent release of the pawl and ratchet mechanisms (not shown) that control rotation of seat back 12 about pivot 13. Also, when cam 152 is in the position illustrated in FIG. 19 (or a position between that of FIGS. 19 and 20), the second stage output cables 190 and 192 do not release the latch mechanisms 18, such that the seat assembly 10 cannot pivot about pivot 16.

As lever 200 is moved through an initial range of movement, cable 176 rotates cam 152 from the position illustrated in FIG. 19 to the position illustrated in FIG. 20, provided interlock cable 185 is configured to permit rotation of cam 152 in this manner. In the illustrated example, end fitting 186 of cable 185 is spaced apart from the end of slot 178 when cam 152 is in the rest position (FIG. 19). Thus, cable 185 does not restrict movement of cam 152 from the position of FIG. 19 to the position of FIG. 20. Powered actuator 201 may be configured to provide for an initial movement of input cable 179 to rotate cam 152 from the position illustrated in FIG. 19 to the position illustrated in FIG. 20. The portion 205 of cam surface 175 between groove 206 and cam lobe peak 207 has a radius that increases slightly, such that wheel 161 of cam follower assembly 158 shifts the cam follower assembly 158 slightly as cam 152 rotates from the position shown in FIG. 19 to the position shown in FIG. 20 to thereby compress coil spring 170 slightly. The force generated by coil spring 170 thereby biases the cam 152 from the position shown in FIG. 20 back to the rest position shown in FIG. 19. Torsion spring 155 is configured to bias cam 152 towards the position illustrated in FIG. 19. Thus, if torsion spring 155 is large enough, cam surface portion 205 may have a constant radius, and torsion spring 155 may provide the sole rotational force biasing cam 152 to the position illustrated in FIG. 19. In use, a user may actuate lever 200 or powered actuator 201 to cause the cam 152 to rotate from the position shown in FIG. 19 to the position shown in FIG. 20. If the user then releases the lever 200 or powered actuator 201, cam 152 will initially rotate from the position shown in FIG. 20 back to the position shown in FIG. 19 due to the bias of torsion spring 155 and/or the bias generated by spring 170 due to wheel 160 contacting cam surface portion 205. In this way, an initial motion of lever 200 or powered actuator 201 can be utilized to release the pawl and ratchet adjustment mechanism 183 (FIGS. 1 and 2) due to motion of first stage cables 191 and 193 to permit rotation of seat back 12 about pivot 13 without releasing latches 18.

If the manual release lever 200 or electrical actuator 201 are further actuated to further move cable 176 and/or cable 179 and thereby rotate cam 152 beyond the position illustrated in FIG. 20 towards the position of FIG. 21, the wheel 160 of cam follower 158 will pass over the cam lobe peak 207. As cam 152 continues to rotate, wheel 160 will travel along cam surface portion 209. The contour of cam surface portion 209 and the line of action of cam follower assembly 158 relative to pivot 212 is configured such that spring 170 generates a relatively large rotational force tending to rotate cam 152 from the position of FIG. 20 to the position of FIG. 21. Once follower wheel 160 moves past cam lobe peak 207, spring 170 expands, and the force generated by spring 170 causes cam 152 to rotate from the position shown in FIG. 20 to the position shown in FIG. 21. The rotational force generated by spring 170 on cam 152 when follower wheel engages cam surface portion 209 is substantially greater than the biasing force generated by torsion spring 155, such that cam 152 generates a relatively large force pulling on "second stage" cables 190 and 192 to ensure that cables 190 and 192 release latches 18 and permit upward rotation of the seat assembly. As cam 152 rotates from the position shown in FIG. 20 to the position shown in FIG. 21, the second stage output cables 190 and 192 move significantly, releasing the latch mechanisms 18 to thereby permit movement of the seat assembly from the position shown in FIG. 1 to the position shown in FIG. 2. Cam lobe peak 207 may include a small protrusion or detent 208. Detent 208 provides tactile feedback to a user manipulating lever 200, and helps to ensure that cam 154 is not inadvertently rotated beyond the position shown in FIG. 20 if a user only desires to release the pawl and ratchet mechanisms 183 to permit angular adjustment of seat back 12 about pivot 13. It will be understood that mechanisms 183 may include a torsion spring that biases seat back 12 about pivot 13.

As the cam 152 rotates from the position shown in FIG. 20 to the position of FIG. 21, spring 170 begins to expand, thereby shifting tube 165 outwardly with respect to the other portions of the mechanism 150. Fitting 167 of tube 165 is pivotally connected to fixed structure 15 (FIG. 1) at 39, such that extension of tube 165 relative to the other portions of mechanism 150 is prevented if latches 18 are engaged. However, once the second stage cables 190 and 192 release latches 18, the seat assembly 10 is free to rotate from the position shown in FIG. 1 to the position shown in FIG. 2, and spring 170 continues to expand after cam 152 rotates to the position of FIG. 21, thereby assisting in movement of the seat assembly to the upright position shown in FIG. 2. It will be understood that FIG. 21 shows cam 152 immediately after it rotates to release latches 18, but before spring 170 has fully expanded to extend tube 165 and rotate the seat assembly from the position of FIG. 1 to the position of FIG. 2.

A small orifice 214 through end piece 167 fluidly connects cavity 215 formed by tube 165 and end 171 of body 159 of cam follower 158 due to the sealing action of O-ring 172 on the inner side wall of tube 165. As spring 170 expands and tube 165 extends away from cam follower assembly 158, the volume of the cavity 215 increases. The size of the orifice 214 through end piece 167 is selected to restrict air flow into the cavity 215, thereby providing a damping force that limits the rate at which tube 165 extends due to the forces generated by spring 170.

Referring again to FIGS. 1 and 2, as the seat assembly 10 rotates from the position shown in FIG. 1 to the position shown in FIG. 2, the center of gravity 80 moves over the pivot point 16, such that the weight of the seat assembly 10 assists rotation after center of gravity 80 passes over pivot 16. Also, as the energy stored in coil spring 170 is expended, the seat assembly 10 gains momentum tending to continue rotation of the seat assembly 10 from the position shown in FIG. 1 to the position shown in FIG. 2. As the seat assembly 10 approaches the fully folded position shown in FIG. 2, it generates a tension force tending to pull tube 165 away from the other portions of mechanism 150. This force pulls the spring 170 away from cam follower assembly 158, such that wheel 160 of cam follower assembly 158 is no longer biased into contact with cam 154 by spring 170. At this point, the torsion spring 155 causes the cam to rotate from the position shown in FIG. 21 back to the position shown in FIG. 19 to thereby reset the cam 152. The seat assembly may include one or more torsion springs 188 biasing the seat towards the folded position of FIG. 2. Torsion springs 188 may be utilized to assist the energy storage mechanism, and thereby reduce the size of coil spring 170.

If a user desires to move the seat assembly 10 from the upright position shown in FIG. 2 back to the use position shown in FIG. 1, a user manually applies a force on the seat assembly 10 causing the seat assembly 10 to rotate back to the position shown in FIG. 1. As the seat assembly 10 is rotated to the use position, the tube 165 is pushed inwardly until it returns to the fully retracted position illustrated in FIG. 19. Once the seat assembly 10 is fully rotated to the use position shown in FIG. 1, the latches 18 are engaged to thereby retain the seat assembly 10 in the use position shown in FIG. 1.

Energy storage mechanism 150 may be configured to generate forces during operation as shown in FIG. 9 and described in more detail above in connection with mechanism 1.

Figure 22:
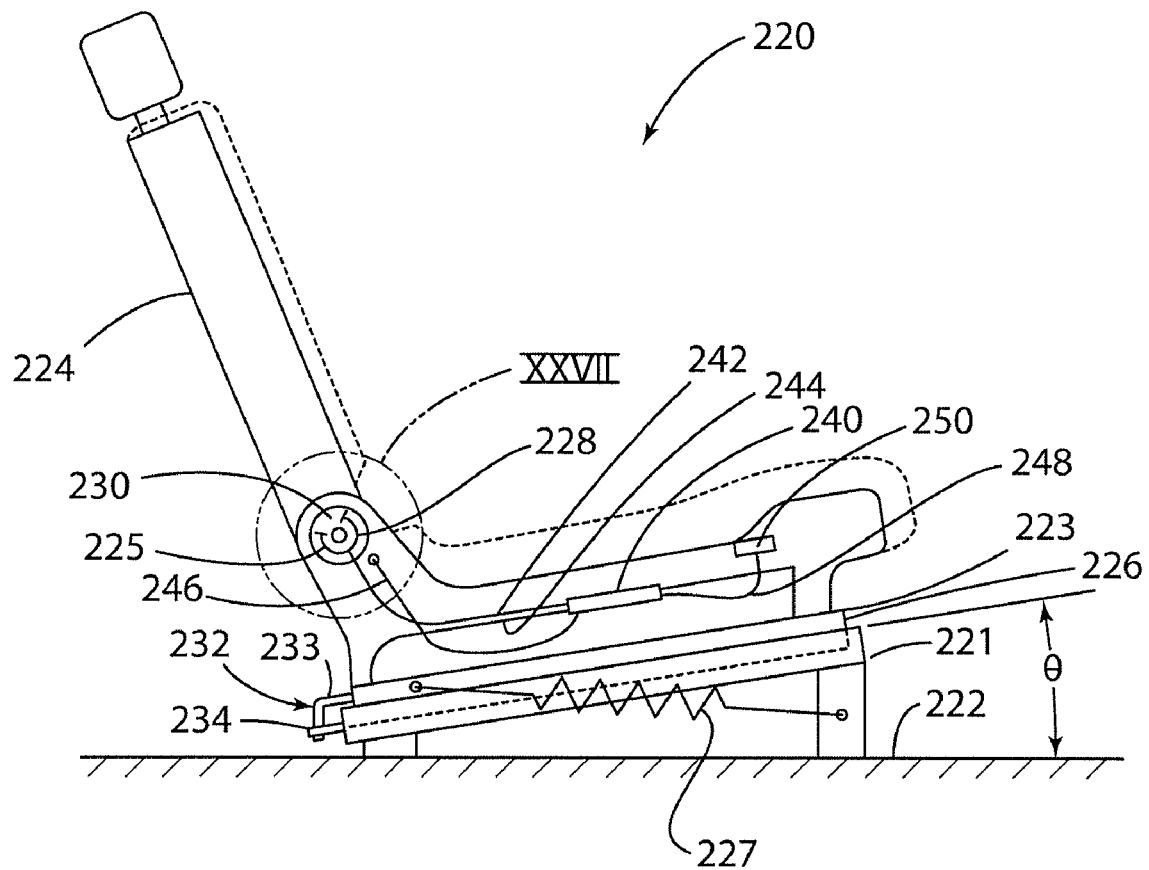
FIG. 22 is a partially fragmentary side elevational view of a folding seat and control mechanism according to another aspect of the present invention.
Figure 23:
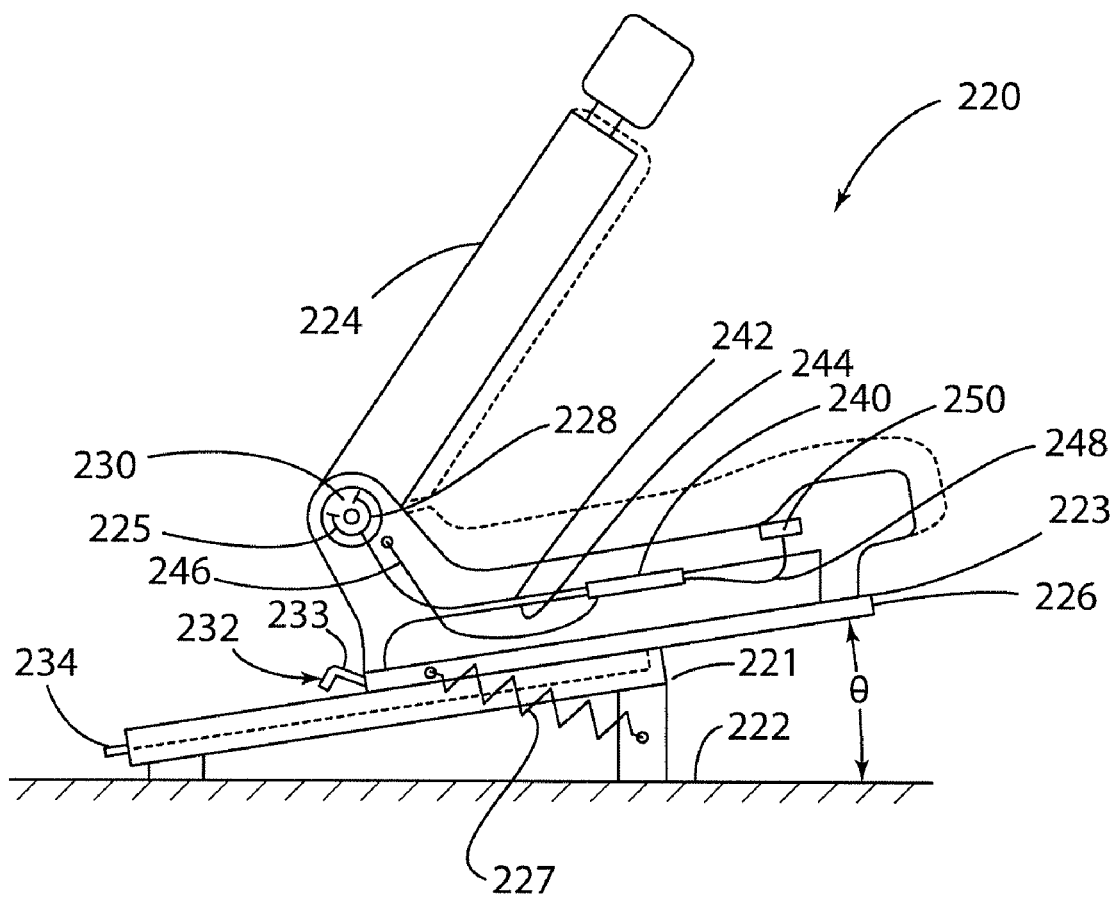
FIG. 23 is a partially fragmentary side elevational view of the folding seat of FIG. 22, wherein the seat assembly is in a forward/folded position.

With further reference to FIGS. 22 and 23, a folding and sliding seat assembly 220 according to another aspect of the present invention that includes a control mechanism 240 that can be actuated to permit movement of the seat assembly 220 from the upright/use position of FIG. 22 to the folded/forward position of FIG. 23. Seat assembly 220 includes a support structure 221 that may be rigidly secured to a vehicle floor structure 222 or the like. The seat assembly 220 also includes a seat base structure 223 and a seat back structure 224 that is pivotably mounted to the seat base 223 by a pivot connection 225. The seat base is slideably mounted to the support structure 221 by linear slides 226 for movement between rearward position (FIG. 22) and a forward position (FIG. 23). A biasing mechanism such as a spring or springs 227 bias the seat base 223 towards the forward position of FIG. 23. In the illustrated example, the linear slides 226 are positioned at a non-zero angle θ relative to the vehicle floor 222. Although the angle θ could be 0 degrees such that the seat back 224 translates horizontally, the angle θ is preferably in a range of about 5 degrees to 15 degrees. Alternately, the angle θ could be negative in some cases. Various support structures, seat base structures, linear slides, springs and/or other biasing mechanisms are known in the art, such that the details of these features will not be described in detail herein.

A torsion spring 228 interconnects the seat back 224 and seat base 223, and biases the seat back 224 towards the folded position (FIG. 23) from the upright position (FIG. 22). The seat assembly 220 may include a pair of pivot structures 225 and a pair of torsion springs 228 with one of each being positioned on each side of the seat structure. Various pivot structure(s) 225 and torsion spring(s) 228 are known in the art, such that these features will not be described in detail herein.

Control mechanism 240 is operably connected to first and second latches 230 and 232, respectively, and mechanism 240 selectively releases latches 230 and 232 to permit sliding and pivoting of the seat assembly 220 from the use position of FIG. 22 to the folded position of FIG. 23.

First releasable latch 230 is configured to selectively retain the seat back 224 in the upright position of FIG. 22, or permit rotation of seat back 224 relative to seat base 223 to the folded position of FIG. 23 upon release of first latch 230. Seat assembly 220 may include a pair of first latches 230 at each side of the seat assembly 220. The first latch 230 may be of a known design, such that the first latch 230 will not be described in detail herein. Second latch 232 (FIG. 22) selectively retains the seat base 223 in the rearward position of FIG. 22 relative to the support structure 221, and permits movement of the seat base 223 towards the forward position of FIG. 23 upon release of the second latch 232. In the illustrated example, the second latch includes a hook-like first part 233 that is movably mounted on the seat base 223, and a second part 234 as mounted on the support structure 221. It will be understood that second latch 232 could have different configurations depending upon the requirements of a particular seat design. Various latches for selectively retaining a vehicle seat in a fore-aft position are known in the art, and the latch 232 will therefore not be described in detail herein.

The first latch 230 is operably connected to a control mechanism 240 by a connector such as first cable 242, and second latch 232 is operably connected to control mechanism 240 by a connector such as second cable 244. As described in more detail below, control mechanism 240 is operably interconnected to the seat back 224 by a reset cable 246 that resets mechanism 240 upon movement of the seat from the folded configuration (FIG. 23) to the use position (FIG. 22). Control mechanism 240 is also operably connected to an input device 250 by an input or release cable 248. Input cable 248 may comprise a Bowden-type cable, and input device 250 may comprise a lever or the like. Alternately, input device 250 may comprise an electrical switch, input/release cable 248 may comprise an electrical line or the like, and an electric motor or other powered actuator (not shown) could be mounted on or adjacent control mechanism 240 to provide for actuation of control mechanism 240. In the illustrated example, the control mechanism 240 is mounted to the seat base structure 223. However, the control mechanism 240 could be mounted to the support structure 221, vehicle floor 222, seat back 224, or other locations, depending upon the requirements of a particular application.

Figure 24:
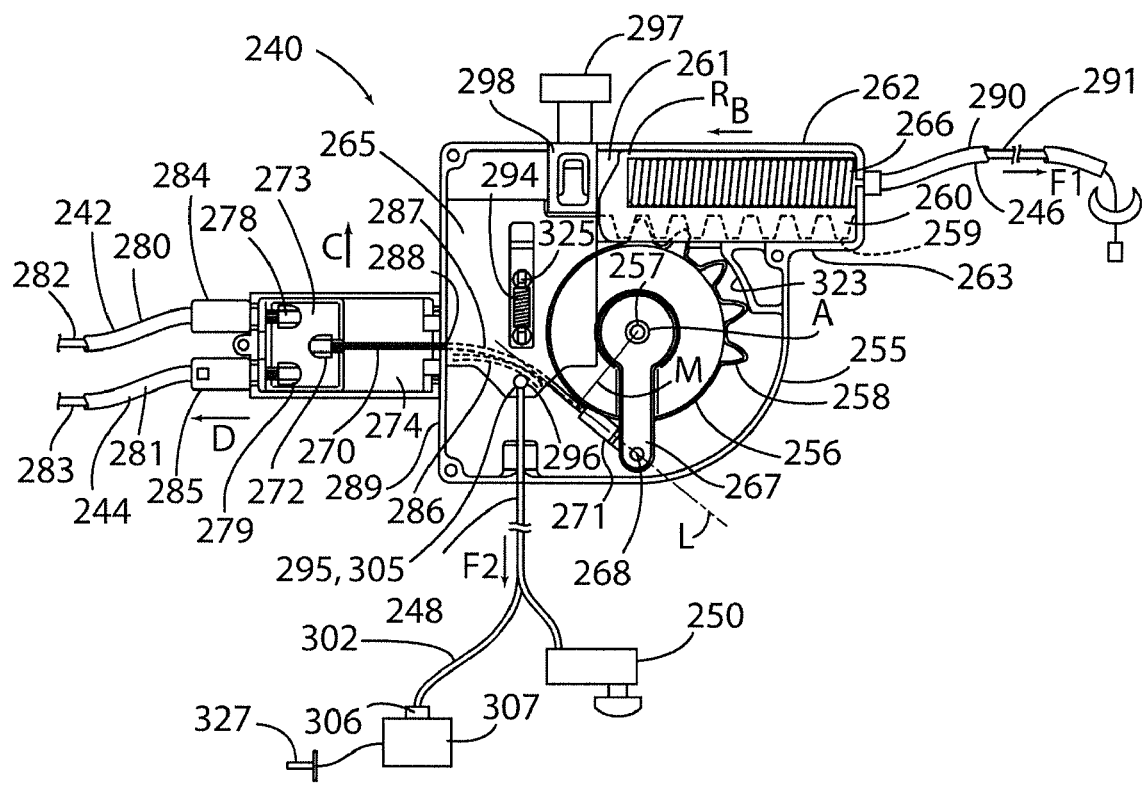
FIG. 24 is a partially fragmentary view of a control mechanism of the seat of FIGS. 22 and 23, wherein the control mechanism is in a first/non-actuated position.
Figure 25:
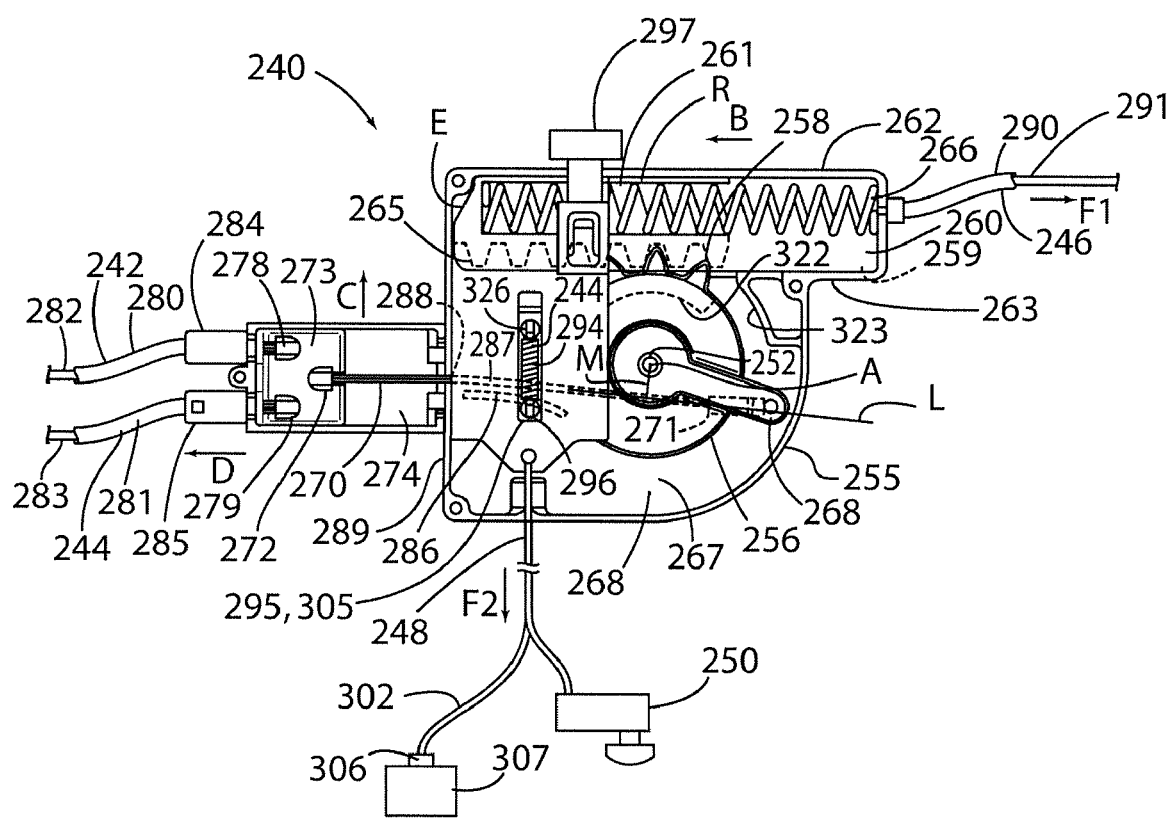
FIG. 25 is a partially fragmentary view of the control mechanism of FIG. 24, wherein the control mechanism is in a second actuated state.
Figure 26:
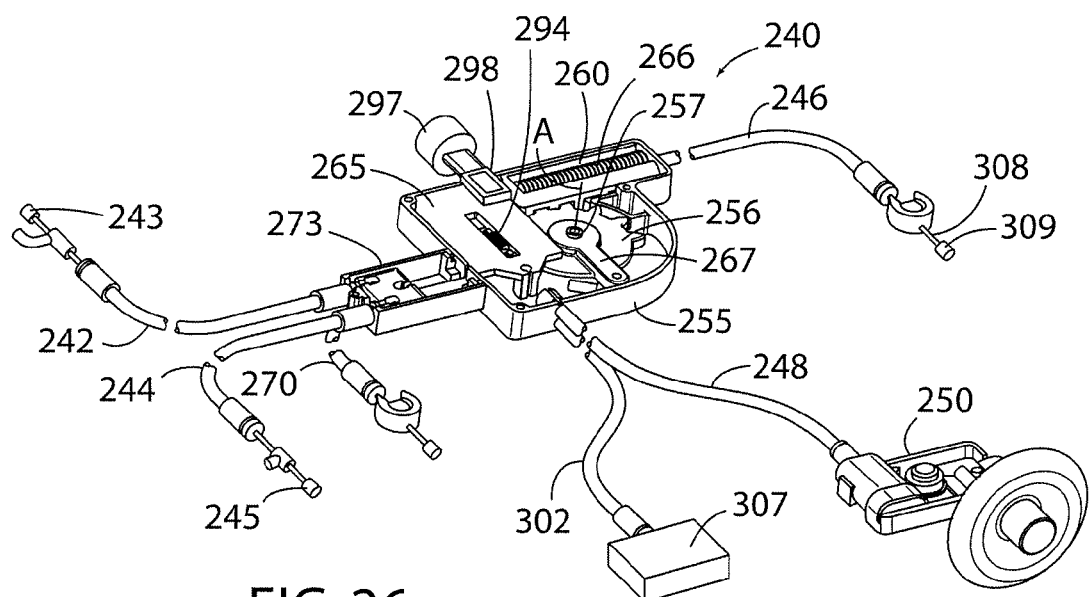
FIG. 26 is a partially fragmentary isometric view of the mechanism of FIGS. 24 and 25.

With further reference to FIGS. 24-26, control mechanism 240 includes a housing 255 and a pinion member 256 that is rotatably mounted in the housing 255 for rotation about a pin or rod 257 defining an axis of rotation "A". Pinion 256 includes a plurality of gears 258 arranged in an arc of a circle that engage linear gears 259 of rack member 260. Rack member 260 is slideably disposed in a space 261 defined by side walls 262 and 263 of housing 255 (see also FIG. 28), such that rack member 260 moves in a linear reciprocating manner in the direction of the arrow "B". A lock member 265 is slideably mounted within housing 255 for reciprocating motion in the direction of the arrow "C". A coil spring 266 provides a biasing force acting on rack member 260, thereby urging rack member 260 to move in the direction of the arrow "B". However, when the lock member 265 is in its extended position shown in FIG. 24, lock member 265 prevents movement of rack member 260 from the retracted position "R" shown in FIG. 24. As discussed in more detail below, lock member 265 may be shifted to a retracted position (FIG. 25), thereby allowing rack member 260 to move to its extended position "E" shown in FIG. 25 due to the forces generated by spring 266.

Referring again to FIG. 24, pinion member 256 includes an arm 267 that extends outwardly away from the pivot axis "A". A first output cable 270 includes a first end 271 that is connected to a connection point 268 on arm 267 of pinion member 256. A second end 272 of first outlet cable 270 is connected to a splitter block 273 that is slideably disposed in a cavity 274 of housing 255 for reciprocating motion in the direction of the arrow "D", (and opposite the arrow "D"). The splitter block 273 is connected to first ends 278 and 279 of first and second cables 242 and 244, respectively. Cables 242 and 244 may comprise Bowden cables having outer sheaths 280 and 281, respectively, and inner cables 282 and 283, respectively. As discussed in more detail below in connection with FIG. 27, and end fitting 309 (see also FIG. 26) may be utilized to connect cable 246 to seat back 224. Fittings 284 and 285 may be utilized to connect the cables 242 and 244 to the housing 255, and connectors 243 and 245, respectively (FIG. 26) may be utilized to connect cables 242 and 244 to latches 230 and 232. A central portion 287 of first output cable 270 extends along a curved guide wall 286 of housing 255 (see also FIG. 28) to thereby retain the central portion 287 of cable 270 in alignment opening 288 in a sidewall 289 of housing 255.

Reset cable 246 (FIG. 24) includes an inner cable 291 and an outer sheath 290. The inner cable 291 is connected to rack member 260, such that a sufficiently large tension force "F1" on inner cable 291 will move the rack member 260 from the extended position (FIG. 25) back to the retracted position of FIG. 24. It will be understood that the force "F1" must be great enough to overcome the biasing force generated by coil spring 266 if it is to move the rack member 260 in this manner. As discussed in more detail below in connection with FIG. 27, an end fitting 309 (see also FIG. 26) may be utilized to connect cable 246 to seat back 224.

Input/release cable 248 includes an end 295 that is received in a slot 296 of lock member 265 (see also FIG. 29) such that a tension force F2 on cable 248 will tend to move lock member 265 in the direction of the arrow F2. A coil spring 294 is connected to a hook/retainer 325 on lock member 265 (see also FIG. 29) and to a hook/retainer 326 on housing 255 (see also FIG. 28). Spring 294 thereby interconnects the lock member 265 with housing 255 and biases lock member 265 in the direction of the arrow "C" from the retracted position shown in FIG. 25 towards the extended or locked position shown in FIG. 24. As discussed in more detail below, a powered actuator 307 may be operably connected to lock member 265 by a cable 302. Powered actuator 307 may be utilized instead of a manual release button or lever device 250, or it may be utilized along with a manual release mechanism.

A push button 297 may also be connected to lock member 265 to provide for release of mechanism 240. Push button 297 may be utilized in place of manual device 250 and powered actuator 307, or it may be utilized in conjunction with one or both devices 250 and 307.

In use, when the seat assembly 220 is in the upright or use position shown in FIG. 22, the control mechanism 240 will initially be in the configuration shown in FIG. 24 wherein the pinion member 256 and rack member 260 are retained in their retracted/non-actuated positions wherein lock member 265 prevents movement of rack member 260. To fold/slide the seat assembly 220 from the configuration of FIG. 22 to the configuration of FIG. 23, a user first actuates powered actuator 307 or moves input device 250, thereby generating a tension force "F2" on input cable 248. Alternately, a user can push on button 297 to move lock member 265 if control mechanism 240 is configured to include push button 297. After the lock member 265 has been shifted to the retracted/ actuated position of FIG. 25, force generated by spring 266 causes rack member 260 to shift from the retracted position of FIG. 24 to the extended position of FIG. 25. As the rack member 260 shifts linearly in a direction opposite the arrow "B", the rack member 260 causes pinion member 256 to rotate in a counter clockwise direction due to the engagement of gears 258 of pinion member 256 with gears 259 of rack member 260. As pinion member 256 rotates from the position of FIG. 24 to the position of FIG. 25, the pinion member 256 pulls on first output cable 270, thereby shifting the splitter block 273 from the position shown in FIG. 24 to the position shown in FIG. 25. Due to the position of the connection point 268, pinion member 256 initially causes first output cable 270 to move a relatively large amount as pinion member 256 rotates. However, as the pinion member 256 approaches the position shown in FIG. 25, the movement of cable 270 as a function of the angular displacement of pinion member 256 is reduced. The linear displacement of cable 270 and splitter block 273 is a sine function of the angular displacement of pinion member 256. Although the displacement of output cable 270 as a function of the angular displacement of pinion member 256 is reduced as the pinion member 256 moves from the position of FIG. 24 to the position of FIG. 25, the force acting on cable 270 may increase as the pinion member 256 moves from the position of FIG. 24 to the position of FIG. 25 as the length of a effective moment arm "M" is reduced. The effective moment arm "M" is shown as a line that is perpendicular to a straight end portion (line "L") of the cable 270 adjacent end 271 of cable 270 that passes through axis A of pinion member 256. It would be understood that the actual force acting on output cable 270 is a function of the angular position of pinion member 256 and the location of connection point 268, as well as the forces vs. deflection characteristics of coil spring 266. In general, because the force generated by coil spring 266 is not perfectively linear, the forces generated on cable 270 as function of the angular displacement of pinion member 256 are not an exact sine function. Furthermore, the shape and location of curved guide wall 286 of housing 255 and location of opening 288 may also effect the position of the line L and length of effective moment arm M. In a preferred embodiment, the force vs. deflection characteristics of spring 266 and the position of connection point 268 are selected such that the forces on output cable 270 (and cables 242 and 244) are substantially constant s pinion member 256 rotates. The connection location 268 and spring 266 can be selected to provide a force and displacement of output cable 270 that meets the requirements of a particular application. In general, connection location 268 and spring 266 can be configured such that the force on cable 270 is substantially constant, or it increases or decreases as pinion member 268 rotates.

Figure 29:
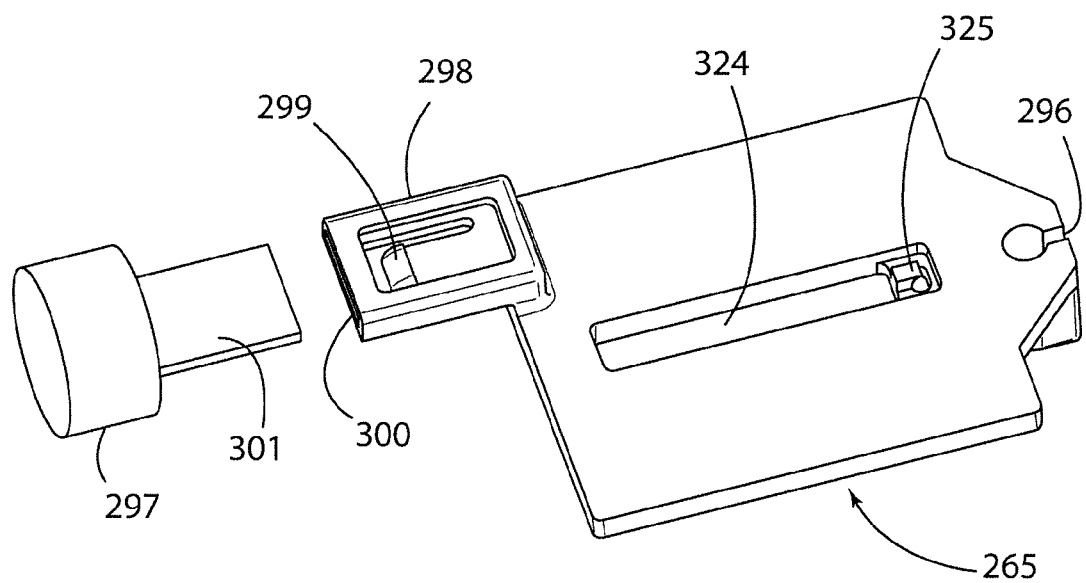
FIG. 29 is an isometric view of a stop of the mechanism of FIGS. 24-26.

With reference to FIG. 29, lock member 265 may include an extension 298 that interconnects with push button 297. In the illustrated example, the extension 298 includes a flexible barbed connector 299 and an opening 200 that receives an extension 301 of push button 297 to thereby snap-attach button 297 to extension 298 of lock member 265. Push button 297 may be used instead of mechanism 250 or powered actuator 307. Alternately, push button 297 may be utilized in addition to mechanism 250 and/or powered actuator 307 to provide for manual release of lock member 265 in the event the mechanism 250 or powered actuator 307 is unable to generate sufficient force to move the lock member 265 from the engaged position of FIG. 24 to the retracted position of FIG. 25. Specifically, a user can push on button 297 to shift the lock member 265 to the release position of FIG. 25 if necessary.

In addition to the input cable 248 that is connected to the input device 250, the control mechanism 240 may also include a second input cable 302 that is also operably interconnected with the lock member 265. The input cable 248 may extend through an opening 303 (see also FIG. 28) in housing 255, and cable 302 may extend through opening 304 in housing 255. End 305 of input cable 302 is received in slot 296 of lock member 265. End 306 of input cable 302 may be connected to powered actuator 307. The powered actuator 307 may comprise an electrically-powered linear actuator that is operably connected to an electrical power supply system of the vehicle (not shown). A switch 327 may be positioned on an actuator 307, or it may be positioned at a remote location such as a vehicle dashboard, interior door panel, or the like.

As discussed above, output cable 270 may be operably connected to a first and second cables 242 and 244 by a splitter block 273 (FIGS. 24 and 25). Alternately, a single output cable 270 may be utilized if two output cables are not required for a particular application. Thus, although a cable 270 is illustrated as being installed along with cables 242 and 244 in FIG. 26, it will be understood that this is for illustration purposes, and if a single cable 270 is utilized to actuate one or more latches, the single cable 270 would be utilized in place of the cables 242 and 244.

Figure 27:
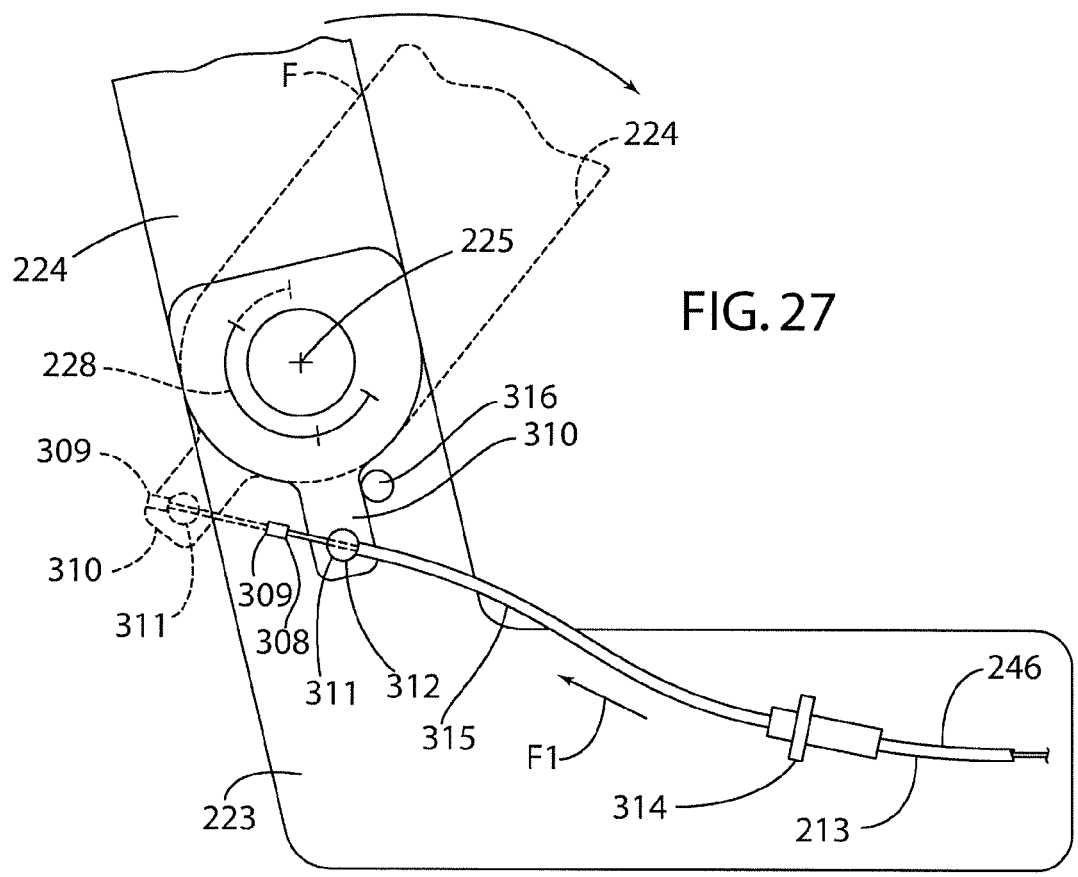
FIG. 27 is a partially fragmentary enlarged view of a portion of the seat of FIG. 22.

With reference to FIG. 27, end 308 of reset cable 246 includes an end fitting 309. An extension 310 of seat back 224 extends downwardly away from the pivot connection 225 about which seat back 224 rotates relative to seat base 223. Outer sheath 313 of cable 246 is connected to seat base 223 by a bracket 314, and inner cable 315 of reset cable 246 is slideably received in an opening 312 of a boss 311 of extension 310 of seat back 224. As the seat back 224 rotates to the folded position "F", fitting 309 at end 308 of inner cable 315 contacts boss 311, and the motion of the seat back 224 thereby generates a pull "F1" on the inner cable 315. This force causes the rack member 260 to be shifted from the actuated/extended position of FIG. 25 to the retracted position of FIG. 24. In the example illustrated in FIG. 27, the end fitting 309 is spaced-apart from boss 311 somewhat when seat back 224 is in the upright position to thereby create a "lost motion" effect whereby the seat back 224 rotates through an initial range of motion before fitting 309 contacts boss 311 and begins pulling on inner cable 315. The lost motion interconnection is optional, however, and it may not be utilized if it is not required for a particular seat design. A stop 316 on seat base 223 contacts extension 310 of seat back 224 upon rotation of seat back 224 to the upright position to prevent rotation of seat back 224 beyond the upright position. It will be understood that the reset cable 246 may be operably interconnected with seat back 224 in a variety of different ways, depending upon the specific configuration of the seat base 223 and seat back 224. In a typical situation, the outer sheath 313 of cable 246 is secured to seat base 223 utilizing a bracket 314 or the like, and end 308 of inner cable 315 is inner connected to the seat back 224 at a point that moves away from bracket 314 as seat back 224 rotates from its upright position to its folded position.

Figure 28:
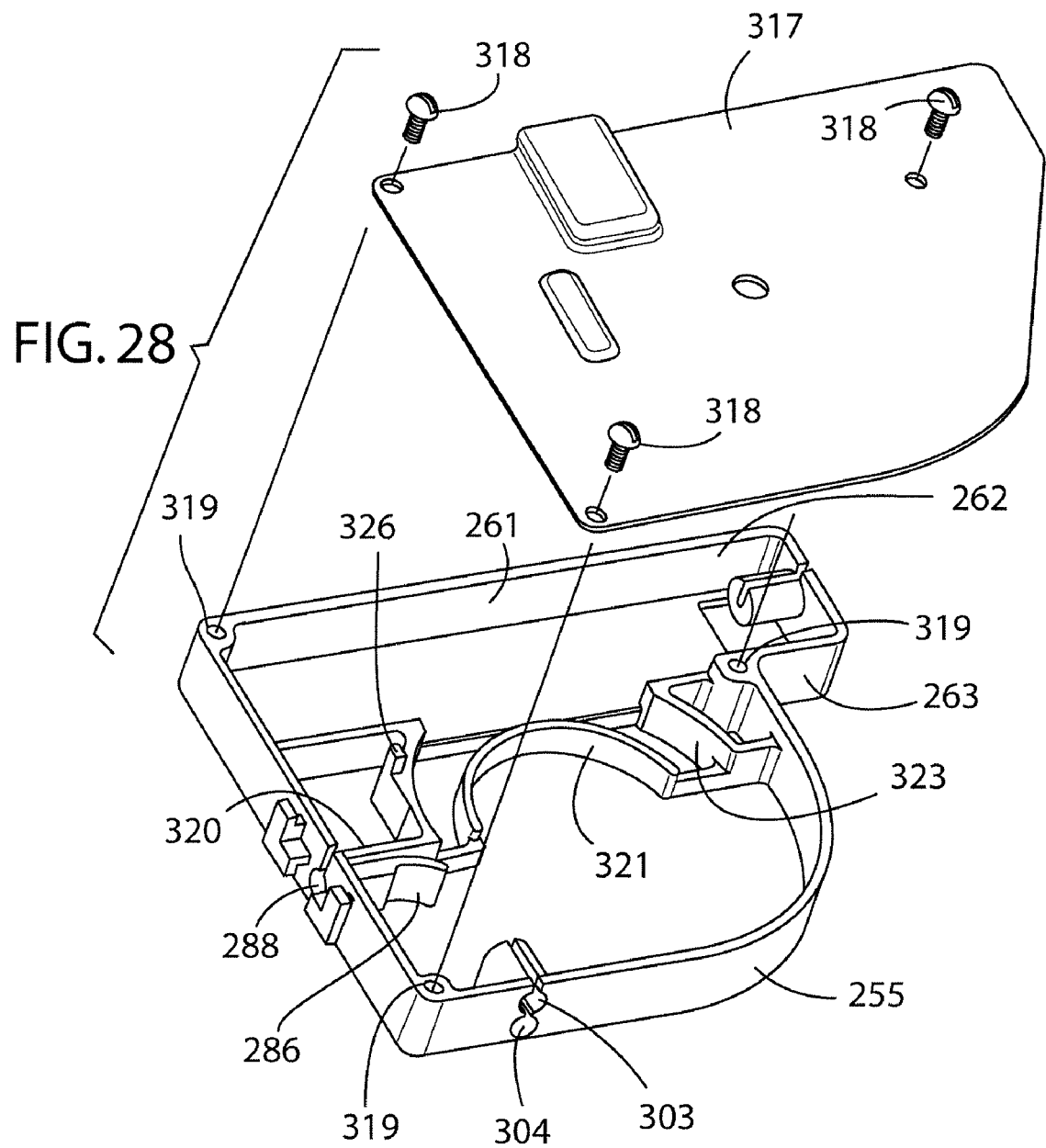
FIG. 28 is an isometric view of the housing of the mechanism of FIGS. 24-26.

With reference to FIG. 28, a cover 317 may be secured to the housing 255 utilizing a plurality of threaded fasteners 318 that are received in openings 319 of housing 255. Also, as discussed above, a central portion 287 of cable 270 extends through opening 288 in housing 255, and the cable 270 slideably engages a curved guide wall 286 of housing 255. Housing 255 may also include a straight guide wall 320 that is spaced-apart from curved guide wall 286. The central portion 287 of cable 270 is thereby received and guided between curved guide wall 286 and straight guide wall 320. Housing 255 also includes a curved pinion support wall 321 that slideably engages an inwardly-facing cylindrical wall surface 322 (FIG. 25) of pinion member 256. A curved wall portion 323 of housing 255 (see also FIG. 24) is configured to guide and retain pinion member 256 by sliding contact with gears 258 of pinion 256. With further reference to FIG. 29, lock member 265 may include a channel 324 that receives spring 294 to thereby bias lock member 265 into the extended position. Spring 294 connects to a hook or retainer 325 on lock member 265, and to a hook or retainer 326 (see also FIG. 28) on housing 255. Housing 255, pinion member 256, rack member 260, lock member 265 and cover 317 may be made of polymer or other suitable materials.

As discussed above, the connection point 268 (FIGS. 24 and 25) on arm 267 of pinion member 256 may be selected to provide a required force on the output cables 242 and 244 as a function of the angular position or displacement of the pinion member 256. In a preferred arrangement, the force generated by spring 266 on rack member 260 is reduced as the spring 266 approaches its extended position of FIG. 25. However, because the length of moment arm "M" becomes smaller as pinion member 256 approaches the position of FIG. 25, the force on cables 242 and 244 is relatively constant as the mechanism 240 moves from the configuration of FIG. 24 to the configuration of FIG. 25. Cables 242 and 244 may also be connected to pinion member 256 at different connection points to provide for different motions and forces for cables 242 and 244 as required for a particular application. Still further, additional output cables may be directly connected to the pinion member if additional latches or other mechanisms are to be actuated by the mechanism 240. For example, various connection points could be utilized for four different cables in substantially the same manner as described in more detail above in connection with the mechanism 150 of FIGS. 17-21. Also, the cables could be connected to the pinion member 256 utilizing slots to provide for a lost motion-type operation if required to provide for a specific timing for a particular application. Examples of such lost motion connections are described in more detail above in connection with the mechanism 150 of FIGS. 17-21. For example, if a particular seat assembly requires that latch 230 is released before latch 232, first cable 242 could be connected directly to pinion member 256, and cable 244 could be connected to pinion member 256 utilizing a slot or other such lost motion device to delay tensioning of cable 244 and release of latch 232.

The weight of the seat back 224 (FIG. 23) creates a moment about the pivot connection 225 as the seat back 224 moves toward the folded position of FIG. 23. The torsion spring (or springs) 228 also generates a bias force tending to rotate the seat back 224 to the folded position. Mechanism 240 is designed such that these forces are sufficiently large to overcome the forces generated by coil spring 266 (FIGS. 24 and 25) of mechanism 240 as the seat back 224 moves from the upright position to the folded position. In this way, the energy from torsion spring 228 and seat back 224 generated as the seat back 224 moves from the upright position to the folded position is stored in the coil spring 266 of mechanism 240. This stored energy is later used to actuate the latches 230 and 232 upon release of mechanism 240. In this way, a relatively small user input force on device 250 can be utilized to actuate the mechanism 240, yet a relatively large output force on cables 242 and 244 is generated to provide for release of latches 230 and 232. Alternately, a relatively low power/small electrically-powered actuator 307 may be utilized to release the mechanism 240. In contrast, existing latch release mechanisms typically do not store significant amounts of energy internally, such that a relatively large manually-operated lever or the like typically needs to be provided to enable a user to generate sufficient force to release the latches 230 and 232. Alternately, existing mechanisms that do not store energy may require use of a relatively large powered actuator capable of generating the relatively large forces required to directly release latches 230 and 232.

In the illustrated example, a linear coil spring 266 acts on rack member 260 to thereby rotate pinion member 256. However, it will be understood that a torsion spring (not shown) acting directly on pinion member 256 may be utilized instead of the rack 260 and coil spring 266. If a torsion spring is utilized in place of rack member 260 and coil spring 266, lock member 265 is configured to act directly on pinion member 256 to selectively retain the pinion member 256 in its retracted position. In general, if a relatively large output force acting on cables 242 and 244 is required, a torsion spring acting on pinion member 256 may be preferable. However, if a somewhat lower force on cables 242 and 244 is required, a coil spring 266 and rack member 260 may be preferable due to the lower costs involved.

Mechanism 240 is shown in FIGS. 22 and 23 in connection with a sliding and folding vehicle seat. However, it will be understood that mechanism 240 may be utilized in a variety of other applications. For example, the mechanism could have a single output cable that releases a seat back for tilting, for fore-aft adjustment, or for height adjustment. Alternately, mechanism 240 may include numerous output cables that are operably connected to numerous latches or other devices.

The energy storage mechanism of the present invention permits a folding seat to be operated by manipulation of a single release mechanism, lever, or the like. Also, as described above, the mechanism of the present invention provides for a relatively small release force and release motion, yet the output of the mechanism is a relatively large force acting over a relatively large movement. A mechanism according to the present invention thereby provides a cost-effective way to provide mechanical assistance in a folding seat, without requiring multiple inputs by a user and/or high input forces and/or large movements by a user.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A folding seat assembly for motor vehicles, comprising:
a support structure;
a seat base structure movably mounted to the support structure for fore and aft movement relative to the support structure between a forward position and a rearward position, wherein the seat base structure is biased towards the forward position;
a seat back structure pivotably mounted to the seat base structure for movement between a generally upright position and a folded position proximate the seat base structure, wherein the seat back structure is biased towards the folded position;
a first releasable latch selectively retaining the seat base structure in the rearward position;
a second releasable latch selectively retaining the seat back structure in the upright position;

a control mechanism comprising;
a housing;
a pinion member rotatably mounted to the housing for rotational movement between a retracted position and an extended position;
a movable rack member that moves between a retracted position and an extended position, wherein the rack member engages the pinion member such that movement of the rack member from its retracted position to its extended position causes the pinion member to rotate from its retracted position to its extended position;
a lock member that is movable between a locked position and a released position, wherein the lock member operably engages at least one of the rack member and the pinion member and prevents movement of the pinion member from its retracted position to its extended position when the lock member is in its locked position, and wherein the lock member permits movement of the pinion member from its retracted position to its extended position when the lock member is in its released position;
first and second elongated flexible members operably connected to the pinion member such that the pinion member pulls on the first and second elongated flexible members as the pinion member rotates in a first direction from its retracted position to its extended position, wherein the first elongated flexible member is operably connected to the first releasable latch, and wherein the second elongated flexible member is operably connected to the second releasable latch, whereby the pinion member pulls on the first and second elongated flexible members and releases the first and second releasable latches as the pinion member moves from its retracted position to its extended position, such that the seat back moves from its upright position to its folded position, and the seat base structure moves from its rearward position to its forward position.

2. The folding seat assembly of claim 1, wherein:
the lock member is biased towards the locked position;
the movable rack member is biased towards its extended position; and including:
a reset member operably connected to the seat back structure and the movable rack member such that the reset member moves the rack member from its extended position to its retracted position as the seat back structure moves to the folded position from the upright position, and the lock member moves to its locked position upon movement of the rack member to its retracted position.

3. The folding seat assembly of claim 2, wherein:
the rack member comprises a plurality of linear teeth, and the pinion member includes a plurality of teeth arranged to define an arc of a circle and engaging the linear teeth whereby linear movement of the rack member causes the pinion to rotate.

4. The folding seat assembly of claim 3, wherein:
the arc extends less than three hundred and sixty degrees.

5. The folding seat assembly of claim 3, wherein:
the rack member is slideably mounted to the housing for reciprocating motion along a first axis;
the lock member is slideably mounted to the housing for reciprocating motion along a second axis that is transverse to the first axis.

6. The folding seat assembly of claim 5, wherein:
the control mechanism defines an interior space, and wherein at least a portion of the rack member is disposed in the interior space when the rack member is in its extended position, and wherein at least a portion of the lock member is disposed in the interior space when the lock member is in its extended position and the rack member is in its retracted position, such that the lock member prevents movement of the rack member to its extended position when the lock member is in its extended position.

7. The folding seat assembly of claim 1, wherein:
the pinion member defines an angular displacement as it rotates in the first direction, and wherein the first and second elongated flexible members move linearly as the pinion member rotates in the first direction, and wherein the movement of the first and second elongated members is a non-linear function of the angular displacement of the pinion member.

8. The folding seat assembly of claim 7, wherein:
the first and second elongated flexible members move at substantially the same rate at substantially the same times.

9. The folding seat assembly of claim 8, wherein:
the pinion member rotates about an axis and defines a connection point that is spaced-apart from the axis;
the first and second elongated flexible members are connected to a single output cable that is connected to the pinion member at the connection point.

10. The folding seat assembly of claim 9, wherein:
the connection point on the pinion member is positioned such that linear movement of the first and second elongated flexible members as a function of the angular displacement is greater when the pinion member is at its retracted position than when the pinion member is at its extended position.

11. The folding seat assembly of claim 10, wherein:
the movable rack member is biased to its extended position by a spring such that the pinion member generates a force tending to rotate the pinion member in the first direction, and wherein the pinion generates a force on the output cable that increases as the pinion member rotates in the first direction.

12. The folding seat assembly of claim 1, wherein:
the first and second elongated flexible members release the first and second releasable latches, respectively, at about the same time.

13. The folding seat assembly of claim 1, wherein:
the first elongated flexible member releases the first releasable latch before the second elongated member releases the second releasable latch.

14. The folding seat assembly of claim 1, wherein:
the seat back structure defines an upper portion, and wherein application of a force in an upward and rearward direction on the upper portion of the seat back structure when the seat back structure is initially in a folded position causes the seat back structure to rotate towards the upright position, and also causes the seat base structure to move rearwardly from the forward position to the rearward position.

15. A seat assembly, comprising:
a support structure;
a seat base movably mounted to the support structure for movement between first and second positions relative to the support structure;
a seat back movably connected to the seat base for movement between first and second positions relative to the seat base;
a first latch selectively retaining the seat base in its first position relative to the support structure;
a second latch selectively retaining the seat back in its first position relative to the seat base;

a control mechanism configured to selectively release the first and second latches, the control mechanism comprising;

a rotating member that is rotatable between first and second positions about an axis to define an angular displacement, and wherein the rotating member is biased towards the second position;

first and second output members operably interconnecting the first and second latches, respectively, to the rotating member, whereby the first and second output members move at a non-linear rate as a function of the angular displacement of the rotating member and selectively release the first and second latches, respectively.

16. The seat assembly of claim 15, including:

a reset member operably interconnecting the seat back and the rotating member such that movement of the seat back from the second position to the first position causes the rotating member to move from its second position to its first position.

17. The seat assembly of claim 16, wherein:

the control mechanism includes a movable lock member selectively retaining the rotating member in its first position.

18. The seat assembly of claim 17, wherein:

the rotating member defines at least one connection point that is spaced-apart from the axis of the rotating member, and wherein at least one of the first and second output members is operably connected to the connection point such that the one output member moves longitudinally upon rotation of the rotating member.

19. The seat assembly of claim 18, wherein:

the first and second output members comprise first and second output cables that are interconnected to a third output cable that is connected to the connection point of the rotating member.

20. The seat assembly of claim 15, wherein:

the rotating member generates a force acting on the first and second output members that increases as the rotating member moves from its first position to its second position.

21. The seat assembly of claim 15, wherein:

the control mechanism releases the first and second latches at substantially the same time.

22. The seat assembly of claim 15, wherein:

the rotatable member comprises a pinion having a plurality of teeth, and the control mechanism includes a rack having a plurality of teeth engaging the teeth of the pinion, and a spring biasing the rack from a first position to a second position.

23. The seat assembly of claim 22, including:

a reset cable operably interconnecting the seat back and the rack such that the reset cable moves the rack to its first position upon movement of the seat back from its second position to its first position.

24. The seat assembly of claim 23, wherein:

the control mechanism includes a lock member that selectively retains the rack in its first position; and including:

an input member that releases the lock member to thereby permit movement of the rack from its first position to its second position.

25. The seat assembly of claim 24, including:

a spring biasing the lock member into a locked position wherein the lock member prevents movement of the rack from its first position to its second position.

* * * * *